US009244545B2

(12) United States Patent
Hinckley et al.

(10) Patent No.: US 9,244,545 B2
(45) Date of Patent: Jan. 26, 2016

(54) TOUCH AND STYLUS DISCRIMINATION AND REJECTION FOR CONTACT SENSITIVE COMPUTING DEVICES

(75) Inventors: Kenneth Paul Hinckley, Redmond, WA (US); Hrvoje Benko, Seattle, WA (US); Steven Bathiche, Kirkland, WA (US); Paul Henry Dietz, Redmond, WA (US); Anoop Gupta, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 304 days.

(21) Appl. No.: 13/530,015

(22) Filed: Jun. 21, 2012

(65) Prior Publication Data

US 2012/0262407 A1    Oct. 18, 2012

Related U.S. Application Data

(63) Continuation-in-part of application No. 12/970,945, filed on Dec. 17, 2010, now Pat. No. 8,660,978, and a continuation-in-part of application No. 12/970,943, filed on Dec. 17, 2010, and a continuation-in-part of application No. 13/026,058, filed on Feb. 11, 2011.

(51) Int. Cl.
*G06F 3/038* (2013.01)
*G06F 3/041* (2006.01)
*G06F 3/0488* (2013.01)

(52) U.S. Cl.
CPC ............ *G06F 3/038* (2013.01); *G06F 3/0418* (2013.01); *G06F 3/04883* (2013.01); *G06F 2203/0381* (2013.01)

(58) Field of Classification Search
CPC ............. G06E 1/00; G06E 3/00; G06F 15/18; G06G 7/00; G06N 3/02
USPC ....................................... 706/15, 62
See application file for complete search history.

(56) References Cited

U.S. PATENT DOCUMENTS 5,149,919 A * 9/1992 Greanias et al. ........... 178/18.02
5,198,623 A   3/1993 Landmeier
(Continued)

FOREIGN PATENT DOCUMENTS

| CN | 101809581 A | 8/2010 |
|---|---|---|
| KR | 10-2012-0005417 | 1/2012 |
| WO | 2009084809 A1 | 7/2009 |

OTHER PUBLICATIONS

Yee, "Two-Handed Interaction on a Tablet Display", CHI 2004, Late Breaking Results Paper, Apr. 24-29, 2004, Vienna, Austria.*
(Continued)

*Primary Examiner* — Jeffrey A Gaffin
*Assistant Examiner* — Ilya Traktovenko
(74) *Attorney, Agent, or Firm* — Steve Wight; Cassandra T. Swain; Micky Minhas

(57) ABSTRACT

A "Contact Discriminator" provides various techniques for differentiating between valid and invalid contacts received from any input methodology by one or more touch-sensitive surfaces of a touch-sensitive computing device. Examples of contacts include single, sequential, concurrent, or simultaneous user finger touches (including gesture type touches), pen or stylus touches or inputs, hover-type inputs, or any combination thereof. The Contact Discriminator then acts on valid contacts (i.e., contacts intended as inputs) while rejecting or ignoring invalid contacts or inputs. Advantageously, the Contact Discriminator is further capable of disabling or ignoring regions of input surfaces, such tablet touch screens, that are expected to receive unintentional contacts, or intentional contacts not intended as inputs, for device or application control purposes. Examples of contacts not intended as inputs include, but are not limited to, a user's palm resting on a touch screen while the user writes on that screen with a stylus or pen.

20 Claims, 5 Drawing Sheets

(56) References Cited

U.S. PATENT DOCUMENTS

| | | | |
|---|---|---|---|
| 5,414,227 A | 5/1995 | Schubert et al. | |
| 5,463,725 A | 10/1995 | Henckel et al. | |
| 5,625,833 A | 4/1997 | Levine et al. | |
| 5,778,404 A | 7/1998 | Capps et al. | |
| 5,867,163 A | 2/1999 | Kurtenbach | |
| 5,914,701 A * | 6/1999 | Gersheneld et al. | 345/156 |
| 5,956,020 A | 9/1999 | D'Amico et al. | |
| 6,307,548 B1 | 10/2001 | Flinchem et al. | |
| 6,788,292 B1 | 9/2004 | Nako et al. | |
| 6,906,703 B2 | 6/2005 | Vablais et al. | |
| 7,231,609 B2 | 6/2007 | Baudisch | |
| 7,289,102 B2 | 10/2007 | Hinckley et al. | |
| 7,362,221 B2 | 4/2008 | Katz | |
| 7,400,316 B2 | 7/2008 | Appleyard et al. | |
| 7,499,024 B2 | 3/2009 | Johnston, Jr. et al. | |
| 7,532,196 B2 | 5/2009 | Hinckley | |
| 7,567,242 B2 | 7/2009 | Perkins et al. | |
| 7,703,047 B2 | 4/2010 | Keely et al. | |
| 7,812,826 B2 | 10/2010 | Ording et al. | |
| 7,812,828 B2 | 10/2010 | Westerman et al. | |
| 7,847,789 B2 | 12/2010 | Kolmykov-Zotov et al. | |
| 7,956,847 B2 | 6/2011 | Christie | |
| 7,982,739 B2 | 7/2011 | Pasula | |
| 8,018,440 B2 | 9/2011 | Townsend et al. | |
| 8,228,292 B1 | 7/2012 | Ruiz et al. | |
| 8,265,705 B2 | 9/2012 | Lee | |
| 8,413,077 B2 | 4/2013 | Yamamoto et al. | |
| 2004/0047505 A1 | 3/2004 | Ghassabian | |
| 2004/0073432 A1 | 4/2004 | Stone | |
| 2004/0189594 A1* | 9/2004 | Sterling | 345/156 |
| 2004/0203520 A1 | 10/2004 | Schirtzinger et al. | |
| 2005/0024346 A1 | 2/2005 | Dupraz et al. | |
| 2005/0052427 A1 | 3/2005 | Wu et al. | |
| 2005/0079896 A1 | 4/2005 | Kokko et al. | |
| 2005/0165839 A1 | 7/2005 | Madan et al. | |
| 2005/0179648 A1 | 8/2005 | Barabe et al. | |
| 2005/0216867 A1 | 9/2005 | Marvit et al. | |
| 2005/0253817 A1 | 11/2005 | Rytivaara et al. | |
| 2006/0012580 A1 | 1/2006 | Perski et al. | |
| 2006/0026535 A1 | 2/2006 | Hotelling et al. | |
| 2006/0109252 A1 | 5/2006 | Kolmykov-Zotov et al. | |
| 2006/0136840 A1 | 6/2006 | Keely et al. | |
| 2006/0146038 A1 | 7/2006 | Park et al. | |
| 2006/0197753 A1 | 9/2006 | Hotelling | |
| 2006/0256008 A1 | 11/2006 | Rosenberg | |
| 2006/0267957 A1* | 11/2006 | Kolmykov-Zotov et al. | 345/173 |
| 2006/0267958 A1 | 11/2006 | Kolmykov-Zotov et al. | |
| 2007/0070051 A1 | 3/2007 | Westerman et al. | |
| 2007/0075965 A1 | 4/2007 | Huppi et al. | |
| 2007/0113198 A1 | 5/2007 | Robertson et al. | |
| 2007/0126732 A1 | 6/2007 | Robertson et al. | |
| 2007/0152976 A1* | 7/2007 | Townsend et al. | 345/173 |
| 2007/0182663 A1 | 8/2007 | Biech | |
| 2007/0188477 A1 | 8/2007 | Rehm | |
| 2007/0198950 A1 | 8/2007 | Dodge et al. | |
| 2007/0247441 A1* | 10/2007 | Kim et al. | 345/173 |
| 2007/0268274 A1 | 11/2007 | Westerman et al. | |
| 2008/0002888 A1 | 1/2008 | Yuan | |
| 2008/0012835 A1 | 1/2008 | Rimon et al. | |
| 2008/0040692 A1 | 2/2008 | Sunday et al. | |
| 2008/0046425 A1 | 2/2008 | Perski | |
| 2008/0055278 A1 | 3/2008 | Locker et al. | |
| 2008/0106520 A1* | 5/2008 | Free et al. | 345/173 |
| 2008/0158145 A1 | 7/2008 | Westerman | |
| 2008/0158168 A1 | 7/2008 | Westerman et al. | |
| 2008/0163130 A1 | 7/2008 | Westerman | |
| 2008/0191898 A1 | 8/2008 | Janik | |
| 2008/0259043 A1* | 10/2008 | Buil et al. | 345/173 |
| 2008/0292195 A1 | 11/2008 | Vijayasenan et al. | |
| 2009/0100384 A1* | 4/2009 | Louch | 715/863 |
| 2009/0109182 A1 | 4/2009 | Fyke et al. | |
| 2009/0160816 A1 | 6/2009 | Westerman et al. | |
| 2009/0167702 A1 | 7/2009 | Nurmi | |
| 2009/0178007 A1 | 7/2009 | Matas et al. | |
| 2009/0209285 A1 | 8/2009 | McMahan | |
| 2009/0228842 A1 | 9/2009 | Westerman et al. | |
| 2009/0259969 A1* | 10/2009 | Pallakoff | 715/808 |
| 2009/0262074 A1 | 10/2009 | Nasiri et al. | |
| 2009/0265671 A1 | 10/2009 | Sachs et al. | |
| 2010/0020025 A1 | 1/2010 | Lemort et al. | |
| 2010/0045705 A1 | 2/2010 | Vertegaal et al. | |
| 2010/0053095 A1 | 3/2010 | Wu et al. | |
| 2010/0053120 A1 | 3/2010 | Chang et al. | |
| 2010/0079493 A1 | 4/2010 | Tse et al. | |
| 2010/0083191 A1 | 4/2010 | Marshall | |
| 2010/0095234 A1 | 4/2010 | Lane et al. | |
| 2010/0103117 A1 | 4/2010 | Townsend et al. | |
| 2010/0103118 A1 | 4/2010 | Townsend et al. | |
| 2010/0123737 A1 | 5/2010 | Williamson et al. | |
| 2010/0127979 A1 | 5/2010 | Lee et al. | |
| 2010/0139990 A1 | 6/2010 | Westerman et al. | |
| 2010/0156941 A1* | 6/2010 | Seung | 345/660 |
| 2010/0175018 A1 | 7/2010 | Petschnigg et al. | |
| 2010/0177121 A1* | 7/2010 | Homma et al. | 345/659 |
| 2010/0188328 A1 | 7/2010 | Dodge et al. | |
| 2010/0194547 A1 | 8/2010 | Terrell et al. | |
| 2010/0214216 A1 | 8/2010 | Nasiri et al. | |
| 2010/0235729 A1 | 9/2010 | Kocienda et al. | |
| 2010/0281435 A1 | 11/2010 | Bangalore et al. | |
| 2010/0295781 A1 | 11/2010 | Alameh et al. | |
| 2010/0295799 A1 | 11/2010 | Nicholson et al. | |
| 2010/0298033 A1 | 11/2010 | Lee | |
| 2010/0306670 A1 | 12/2010 | Quinn et al. | |
| 2010/0328227 A1 | 12/2010 | Matejka et al. | |
| 2011/0115741 A1 | 5/2011 | Lukas et al. | |
| 2011/0134026 A1 | 6/2011 | Kang et al. | |
| 2011/0163955 A1 | 7/2011 | Nasiri et al. | |
| 2011/0167357 A1 | 7/2011 | Benjamin et al. | |
| 2011/0187651 A1 | 8/2011 | Whitlow et al. | |
| 2011/0193788 A1 | 8/2011 | King et al. | |
| 2011/0197153 A1 | 8/2011 | King et al. | |
| 2011/0221777 A1 | 9/2011 | Ke | |
| 2011/0231796 A1 | 9/2011 | Vigil | |
| 2011/0239110 A1 | 9/2011 | Garrett et al. | |
| 2012/0092268 A1 | 4/2012 | Tsai et al. | |
| 2012/0092269 A1 | 4/2012 | Tsai et al. | |
| 2012/0154293 A1 | 6/2012 | Hinckley et al. | |
| 2012/0154294 A1 | 6/2012 | Hinckley et al. | |
| 2012/0154295 A1 | 6/2012 | Hinckley et al. | |
| 2012/0154296 A1 | 6/2012 | Hinckley et al. | |
| 2012/0242598 A1 | 9/2012 | Won et al. | |
| 2012/0313865 A1 | 12/2012 | Pearce | |
| 2012/0327040 A1 | 12/2012 | Simon et al. | |
| 2012/0327042 A1 | 12/2012 | Harley et al. | |
| 2013/0016055 A1 | 1/2013 | Chuang | |
| 2013/0106725 A1 | 5/2013 | Bakken et al. | |
| 2013/0106740 A1 | 5/2013 | Yilmaz et al. | |
| 2013/0120281 A1 | 5/2013 | Harris | |
| 2013/0181948 A1 | 7/2013 | Sakai | |
| 2013/0335333 A1 | 12/2013 | Kukulski et al. | |
| 2014/0073432 A1 | 3/2014 | Lu et al. | |
| 2014/0108979 A1 | 4/2014 | Davidson et al. | |
| 2014/0210797 A1 | 7/2014 | Kreek et al. | |
| 2014/0253522 A1 | 9/2014 | Cueto | |

OTHER PUBLICATIONS

"International Search Report", Mailed Date: Jul. 31, 2012, Application No. PCT/US2011/065680, Filed Date: Dec. 17, 2011, pp. 13.

Joselli, et al., "gRmobile: A Framework for Touch and Accelerometer Gesture Recognition for Mobile Games", VIII Brazilian Symposium on Digital Games and Entertainment, IEEE, 2009, pp. 141-150.

Figueroa-Gibson, G., U.S. Office Action, U.S. Appl. No. 12/970,943, Nov. 6, 2013.

Traktovenko, Ilya, U.S. Notice of Allowance, U.S. Appl. No. 12/970,945, Oct. 16, 2013.

Figueroa-Gibson, Gloryvid, U.S. Final Office Action, U.S. Appl. No. 12/970,949, Nov. 29, 2013, pp. 1-29.

Figueroa-Gibson, Gloryvid, U.S. Office Action, U.S. Appl. No. 12/970,943, Mar. 13, 2014, pp. 1-25.

Figueroa-Gibson, Gloryvid, U.S. Office Action, U.S. Appl. No. 12/970,939, Dec. 19, 2013, pp. 1-28.

Zhou, Hong, U.S. Final Office Action, U.S. Appl. No. 13/026,058, Feb. 26, 2014, pp. 1-14.

(56) References Cited

OTHER PUBLICATIONS

Treitler, Damon, U.S. Final Office Action, U.S. Appl. No. 13/327,794, Dec. 19, 2013, pp. 1-16.
"First Office Action and Search Report Received in Chinese Patent Application No. 201110427737.8", Mailed Date: Mar. 28, 2014, Filed Date: Jun. 21, 2012, 19 Pages.
Balakrishnan, et al., Digital tape drawing, Proceedings of the 12th Annual ACM Symposium on User Interface Software and Technology, ACM Symposium on User Interface Software and Technology, UIST '99, Nov. 7-10, 1999, pp. 161-169, Asheville, USA.
Brandl, et al., "Occlusion-aware menu design for digital tabletops", Proc. of the 27th Int'l Conf. in Human Factors In Computing Systems, CHI 2009, Extended Abstracts, Apr. 4-9, 2009, pp. 3223-3228, Boston, MA, USA.
Buxton, W., "Integrating the Periphery and Context: A New Model of Telematics Proceedings of Graphics Interface", 1995, pp. 239-246.
Chu, et al., "Detail-preserving paint modeling for 3D brushes", Proc. of the 8th Int'l Symposium on Non-Photorealistic Animation and Rendering 2010, NPAR 2010, Jun. 7-10, 2010, pp. 27-34, Annecy, France.
Fitzmaurice, et al., "An Exploration into Supporting Artwork Orientation in the User Interface", Proc. of the CHI '99 Conf. on Human Factors in Computing Sys's: The CHI is the Limit, Pittsburgh, CHI 1999, May 15-20, 1999, pp. 167-174.
Guiard, et al., "Writing Postures in Left-Handers: Inverters are Hand-Crossers", Neuropsychologia, Mar. 1984, pp. 535-538, vol. 22, No. 4.
Hinckley, et al., "Codex: A dual screen tablet computer", Proc. of the 27th Int'l Conf. on Human Factors in Computing Sys's, CHI 2009, Apr. 4-9, 2009, pp. 1933-1942, Boston, MA, USA.
Kurtenbach, et al., "The design of a GUI paradigm based on tablets, two-hands, and transparency", Proceedings of the ACM SIGCHI Conference on Human factors in computing systems, CHI 1997, Mar. 1997, pp. 35-42.
Lee, et al., "HandSCAPE: A vectorizing tape measure for on-site measuring applications", Proceedings of the CHI 2000 Conference on Human factors in computing systems, CHI 2000, Apr. 1-6, 2000, pp. 137-144, The Hague, The Netherlands.
Luff, et al., Mobility in Collaboration, Proceedings of the ACM 1998 Conference on Computer Supported Cooperative Work, CSCW 1998, Nov. 14-18, 1998, pp. 305-314, Seattle, WA, USA.
Mahony, et al., Nonlinear Complementary Filters on the Special Orthogonal Group, IEEE Trans. Automat. Contr., 2008, pp. 1203-1218, vol. 53, No. 5.
Mason, et al., "Grip Forces When Passing an Object to a Partner", Exp. Brain Res., May 2005, vol. 163, No. 2, pp. 173-187.
Premerlani, et al., Direction Cosine Matrix IMU: Theory, retrieved from gentlenav.googlecode.com/files/DCMDraft2.pdf, May 2009, pp. 1-30.
Siio, et al., "Mobile Interaction Using Paperweight Metaphor", Proc. of the 19th Annual ACM Symposium on User Interface Software and Technology, UIST '06, Oct. 2006, pp. 111-114, Montreux, Switzerland.
Wimmer, et al., HandSense: Discriminating Different Ways of Grasping and Holding a Tangible User Interface, Proceedings of the 3rd International Conference on Tangible and Embedded Interaction, TEI '09, Feb. 2009, pp. 359-362, Cambridge, UK.
Figueroa-Gibson, Gloryvid, U.S. Office Action, U.S. Appl. No. 12/970,949, Mar. 13, 2014, pp. 1-29.
Figueroa-Gibson, Gloryvid, U.S. Final Office Action, U.S. Appl. No. 12/970,939, May 30, 2014, pp. 1-32.
Geisy, Adam, U.S. Office Action, U.S. Appl. No. 13/367,377, Feb. 13, 2014, pp. 1-11.
Herot, et al., "One-Point Touch Input of Vector Information from Computer Displays", SIGGRAPH '78 Proceedings of the 5th Annual Conference on Computer Graphics and Interactive Techniques, 12(3),1978, pp. 210-216.
Hinckley, et al., "Design and Analysis of Delimiters for Selection-Action Pen Gesture Phrases in Scriboli", CHI '05 Proceedings of the SIGCHI Conference on Human Factors in Computing Systems, pp. 451-460.
Hinckley, et al., "Sensing Techniques for Mobile Interaction", UIST'00 Proceedings of the 13th Annual ACM Symposium on User Interface Software and Technology, pp. 91-100.
Hinckley, et al., "Manual Deskterity: An Exploration of Simultaneous Pen + Touch Direct Input", CHI EA '10 Proceedings of the 28th of the International Conference, Extended Abstracts on Human Factors in Computing Systems, pp. 2793-2802.
Hudson, et al., "Whack Gestures: Inexact and Inattentive Interaction with Mobile Devices", TEI '10 Proceedings of the fourth International Conference on Tangible, Embedded, and Embodied Interaction, pp. 109-112.
Iwasaki, et al., "Expressive Typing: A New Way to Sense Typing Pressure and Its Applications", CHI '09 Proceedings of the 27th International Conference Extended Abstracts on Human Factors in Computing Systems, pp. 4369-4374.
Josh!, et al., "Image Deblurring Using Inertial Measurement Sensors", ACM SIGGRAPH 2010, CHI 2009: Spotlight on Works in Progress—Session 2, pp. 4369-4374.
Kratz, et al., "Unravelling Seams: Improving Mobile Gesture Recognition with Visual Feedback Techniques", CHI '09 Proceedings of the 27th International Conference on Human Factors in Computing Systems, 2009, pp. 937-940.
Liao, et al., "PACER: Fine-grained Interactive Paper via Cameratouch Hybrid Gestures on a Cell Phone", CHI '10 Proceedings of the 28th International Conference on Human Factors in Computing Systems, Apr. 2010, pp. 2441-2450.
Oviatt, et al., "Toward a Theory of Organized MultimodalIntegration Patterns during Human-Computer Interaction", ICMI '03 Proceedings of the 5th International Conference on Multimodal Interfaces, pp. 44-51.
Partridge, et al., "TiltType: Accelerometer-Supported Text Entry for Very Small Devices", UIST '02 Proceedings of the 15th Annual ACM Symposium on User Interface Software and Technology, 2002, pp. 201-204.
Rahman, et al., "Tilt Techniques: Investigating the Dexterity of Wrist-Based Input", CHI '09 Proceedings of the 27th international Conference on Human Factors in Computing Systems, pp. 1943-1952.
Roudaut, et al., "TimeTilt Using Sensor-Based Gestures to Travel through Multiple Applications on a Mobile Device", INTERACT '09, Proceedings of the 12th IFIP TC 13 International Conference on Human-Computer Interaction: Part I, 4 pages.
Schmidt, et al., "Advanced Interaction in Context", HUC '99, Proceedings of the 1st International Symposium on Handheld and Ubiquitous Computing, 13 pages.
Schwarz, et al., "A Framework for Robust and Flexible Handling of Inputs with Uncertainty", UIST '10, Proceedings of the 23nd Annual ACM Symposium on User Interface Software and Technology, Oct. 2010, pp. 47-56.
Schwesig, et al., "Gummi: A Bendable Computer", CHI '04, Proceedings of the SIGCHI Conference on Human Factors in Computing Systems, 2004, pp. 263-270.
Sellen, et al., "The Prevention of Mode Errors through Sensory Feedback", Journal of Human-Computer Interaction, vol. 7, Issue 2, Jun. 1992, pp. 141-161.
Taylor, et al., "Graspables: Grasp-Recognition as a User Interface", CHI '09 Proceedings of the 27th International Conference on Human factors in Computing Systems, Apr. 2009, pp. 917-925.
Wigdor, et al., "TiltTextUsing Tilt for Text Input to Mobile Phones", UIST '03, Proceedings of the 16th Annual ACM Symposium on User Interface Software and Technology, 2003, pp. 81-90.
Williamson, et al., "Shoogle: Excitatory MultimodalInteraction on Mobile Devices", CHI '07, Proceedings of the SIGCHI Conference on Human factors in Computing Systems, 2007, pp. 121-124.
Hassan, et al., "Chucking: A One-Handed Document Sharing Technique," T. Gross et al. (Eds.): INTERACT 2009, Part II, LNCS 5727, 2009, pp. 264-278.
Rekimoto, Jen., "Tilting operations for small screen interfaces (Tech Note)", UIST '96, Proceedings of the 9th Annual ACM Symposium on User Interface Software and Technology, 1996, pp. 167-168.
Walker, Geoff., "Palm rejection on resistive touchscreens", Nov. 2005, pp. 31-33.

(56) References Cited

OTHER PUBLICATIONS

Shanklin, Will, "[Video] New HTC Flyer Hands-on Shows Stylus' "Palm Rejection" in Action", Retrieved Date: Nov. 23, 2011, 20 pages.
Wigdor, et al., "Lucid Touch: a See-through Mobile Device," Proceedings of the 20th Annual ACM Symposium on User Interface Software and Technology, 2007, pp. 269-278.
Song, et al., "WYSIWYF: Exploring and Annotating Volume Data with a Tangible Handheld Device", Proceedings of the 2011 Annual Conference on Human Factors in Computing Systems, May 2011, 10 pages.
Ruiz, et al., "User-Defined Motion Gestures for Mobile Interaction", Proceedings of the 2011 Annual Conference on Human factors in Computing Systems, May 2011, 10 pages.
Dachselt, et al., "Throw and Tilt —Seamless Interaction across Devices Using Mobile Phone Gestures", Proceedings of 34th Graphics Interface Conference, May 2008, 7 pages.
Hinckley, et al., "Sensor Synaesthesia: Touch in Motion, and Motion in Touch", Proceedings of the 2011 Annual Conference on Human Factors in Computing Systems, May 2011, 10 pages.
Hinckley, et al., U.S. Appl. No. 13/327,794, filed Dec. 16, 2011, entitled "Gesture Combining Multi-Touch and Movement", 53 pages.
Hinkley, et al., U.S. Appl. No. 12/970,945, filed Dec. 17, 2010, entitled "Detecting and Responding to Unintentional Contact with a Computing Device," 47 pages.
Hinckley, et al., U.S. Appl. No. 12/970,949, filed Dec. 17, 2010, entitled "Cooperative Use of Plural Input Mechanisms to Convey Gestures," 46 pages.
Hinckley, et al., U.S. Appl. No. 12/970,939, filed Dec. 17, 2010, entitled "Detecting Gestures Involving Intentional Movement of a Computing Device," 68 pages.
Hinckley, et al., U.S. Appl. No. 12/970,955, filed Dec. 17, 2010, entitled "Supplementing a Touch Input Mechanism With Fingerprint Detection," 40 pages.
Hinckley, et al., U.S. Appl. No. 13/367,377, filed Feb. 7, 2012, entitled "Multi-Touch-Movement Gestures for Tablet Computing Devices," 64 pages.
Döring, et al., "Exploring Gesture-Based Interaction Techniques in Multi-Display Environments with Mobile Phones and a Multi-Touch Table", Proceedings of the Workshop on Coupled Display Visual Interfaces, May 25, 2010, pp. 47-54.
"N-act Multi-Touch Gesture Vocabulary Set", Retrieved Date: Oct. 12, 2011, 1 page.
Savov, Vlad., "Samsung Galaxy S II Shows Off Motion-Zoom Option in TouchWiz 4.0 (Video)", Retrieved Date: Oct. 13, 2011, Engadget, AOL Tech., AOL, Inc., Vienna, VA, posted Mar. 29, 2011, 3 pages.
"Samsung Exhibit II 4G review: Second time around", GSMArena. com, Dec. 1, 2011, p. 5 of online article, 3 pages.
Bjørneseth, et al., "Dynamic Positioning Systems—Usability and Interaction Styles", Proceedings of the 5th Nordic Conference on Human-Computer Interaction: Building Bridges, Oct. 2008, 10 pages.
Edge, et al., "Bimanual Tangible Interaction with Mobile Phones", Proceedings of the 3rd International Conference on Tangible and Embedded Interaction, Feb. 2009, pp. 131-136.
Malacria, et al., "Clutch-Free Panning and Integrated Pan-Zoom Control on Touch-Sensitive Surfaces: The CycloStar Approach", Proceedings of the 28th International Conference on Human Factors in Computing Systems, Apr. 2010, 10 pages.
Ashbrook, et al., "MAGIC: A Motion Gesture Design Tool", Proceedings of the 28th International Conference on Human Factors in Computing Systems, Apr. 2010, 10 pages.
Hinckley, et al., "Foreground and Background Interaction with Sensor-Enhanced Mobile Devices", ACM Transactions on Computer-Human Interaction, vol. 12, No. 1, Mar. 2005, 22 pages.

Hinckley, et al., "Direct Display Interaction via Simultaneous Pen + Multi-touch Input", Society for Information Display (SID) Symposium Digest of Technical Papers, vol. 41, No. 1, May 2010, pp. 537-540.
"PenLab: Itronix GoBook Duo-Touch", Retrieved Date: Jun. 22, 2010, Pen Computing Magazine, 3 pages.
Babyak, Richard., "Controls & Sensors: Touch Tones", Appliance Design, Jun. 30, 2007, 3 pages.
Bao, et al., "Effect of Tilt Angle of Tablet on Pen-based Input Operation Based on Fitts' Law", Proceedings of the 2010 IEEE International Conference on Information and Automation, Jun. 2010, pp. 99-104.
Bi, et al. "An Exploration of Pen Rolling for Pen-based Interaction", UIST '08 Proceedings of the 21st Annual ACM Sympiosium on User interface and Technology, Oct. 2008, 10 pages.
Mohamed, et al., "Disoriented Pen-Gestures for Identifying Users around the Tabletop without Cameras and Motion Sensors" Proceedings of the First IEEE International Workshop on Horizontal Interactive Human-Computer Systems (Tabletop '06), Jan. 2006, 8 pages.
Mulroy., "N-Trig Pushes Pen and Multitouch Input", May 19, 2010, 3 pages.
Ramos, et al., "Pressure Marks", CHI 2007 Proceedings of the SIGCHI Conference on Human Factors in Computing Systems, Apr.-May 2007, pp. 1375-1384.
Song, et al., "Grips and Gestures on a Multi-Touch Pen", CHI 2011, May 7-12, 2011, ACM, 10 pages.
Taylor, et al., "Graspables: Grasp-Recognition as a User Interface", CHI 2009 Proceedings of the 27th International Conference on Human Factors in Computing Systems, Apr. 2009, pp. 917-925.
Kendrick, Jamse., "ChromeTouch: Free Extension for Touch Tablets", GigaOM, May 6, 2010, 9 pages.
Izadi, et al., "C-Slate: A Multi-Touch and Object Recognition System for Remote Collaboration using Horizontal Surfaces", Second Annual IEEE International Workshop on Horizontal Interactive Human-Computer System, 2007, pp. 3-10.
Thurrott, Paul., "Windows XP Tablet PC Edition reviewed", Paul Thurrott's SuperSite for Windows, Jun. 25, 2002, 7 pages.
Bartlett, Joel F., "Rock 'n' Scroll is here to stay", Western Research Laboratory, May 2000, 9 pages.
Buxton, William., "Lexical and Pragmatic Considerations of Input Structure", ACM SIGGRAPH Computer Graphics, vol. 17, Issue 1, Jan. 1983, pp. 31-37.
Buxton, William., "Chunking and Phrasing and the Design of Human-Computer Dialogues", Proceedings of the IFIP World Computer Congress, 1986, 9 pages.
Buxton, William., "A Three-State Model of Graphical Input", in D. Diaper, et al. (Eds), Human-Computer Interaction—INTERACT '90, Amsterdam: Elsevier Science Publishers B.V. (North-Holland), 8 pages.
Card, et al., "The Design Space of Input Devices", CHI '90 Proceedings of the SIGCHI Conference on Human factors in computing Systems, 1990, pp. 117-124.
Chen, et al., "Navigation Techniques for Dual-Display E-Book Readers," CHI '08 Proceeding of the Twenty-Sixth Annual SIGCHI Conference on Human Factors in Computing Systems, 2008, pp. 1779-1788.
Cho, et al., "Multi-Context Photo Browsing on Mobile Devices Based on Tilt Dynamics", MobileHCI '07 Proceedings of the 9th International Conference on Human Computer Interaction with Mobile Devices and Services, 2007, pp. 190-197.
Chun, et al., "Virtual Shelves: Interactions with Orientation-Aware Devices", UIST'09, 2009, pp. 125-128.
Cohen, et al., "Synergistic Use of Direct Manipulation and Natural Language", CHI'89 Proceedings of the SIGCHI Conference on Human Factors in Computing Systems, 1989, pp. 227-233.
Eslambolchilar, et al., "Tilt-Based Automatic Zooming and Scaling in Mobile Devices—A State-Space Implementation", 6th International Symposium on Mobile Human-Computer Interaction, 2004, Sep. 2004, 13 pages.
Essl, et al., "Use the Force (or something)—Pressure and Pressure-Like Input for Mobile Music Performance", NIME 2010 Conference on New Interfaces for Musical Expression, Jun. 2010, 4 pages.

(56) References Cited

OTHER PUBLICATIONS

Harrison, et al., "Squeeze Me, Hold Me, Tilt Me! An Exploration of Manipulative User Interfaces", CHI '98 Proceedings of the SIGCHI Conference on Human Factors in Computing Systems, pp. 17-24.

Harrison, et al., "Scratch Input: Creating Large, Inexpensive, Unpowered and Mobile Finger Input Surfaces", UIST '08 Proceedings of the 21st Annual ACM Symposium on User interface Software and Technology, pp. 205-208.

Harrison, et al., "Skinput: Appropriating the Body as an Input Surface", CHI '10 Proceedings of the 28th International Conference on Human Factors in Computing Systems, Apr. 2010, pp. 453-462.

Aliakseyeu, D., A. Lucero, S. Subramanian, Interacting with piles of artifacts on digital tables, Digital Creativity, Jul. 2007, pp. 161-174, vol. 18, No. 3.

Balakrishnan, et al., "The Rockin'Mouse: Integral 3D Manipulation on a Plane", In Proceedings of the ACM SIGCHI Conference on Human Factors in Computing Systems, Mar. 22, 1997, 8 pages.

Bi, et al., "An Exploration of Pen Rolling for Pen-Based Interaction", In Proceedings of the 21st Annual ACM Symposium on User Interface Software and Technology, Oct. 19, 2008, 10 pages.

Brandl, et al., "Combining and Measuring the Benefits of Bimanual Pen and Direct-Touch Interaction on Horizontal Interfaces", In Proceedings of the Working Conference on Advanced Visual Interfaces, May 28, 2008, 10 pages.

Fitzmaurice, et al., "Tracking Menus", In Proceedings of the 16th Annual ACM Symposium on User Interface Software and Technology, Nov. 2, 2003, 10 pages.

Frisch, et al., "Investigating Multi-Touch and Pen Gestures for Diagram Editing on Interactive Surfaces", In ACM International Conference on Interactive Tabletops and Surfaces, Nov. 23, 2009, 8 pages.

Grossman, et al., "Hover Widgets: Using the Tracking State to Extend the Capabilities of Pen-Operated Devices", In Proceedings of the SIGCHI Conference on Human Factors in Computing Systems, Apr. 22, 2006, 10 pages.

Hinckley, et al., "Pen + Touch = New Tools", In Proceedings of the 23nd Annual ACM Symposium on User Interface Software and Technology, Oct. 3, 2010, 10 pages.

Hinckley, Ken, "Synchronous Gestures for Multiple Persons and Computers", In Proceedings of the 16th Annual ACM Symposium on User Interface Software and Technology, Nov. 2, 2003, 10 pages.

Hinckley, et al., "Touch-Sensing Input Devices", In Proceedings of the SIGCHI Conference on Human Factors in Computing Systems, May 15, 1999, 8 pages.

Holmquist, et al., "Smart-Its Friends: A Technique for Users to Easily Establish Connections between Smart Artefacts", In Proceedings of the 3rd International Conference on Ubiquitous Computing, Sep. 30, 2001, 6 pages.

Kurtenbach, et al., "Issues in Combining Marking and Direct Manipulation Techniques", In Proceedings of the 4th Annual ACM Symposium on User Interface Software and Technology, Nov. 11, 1991, 8 pages.

Lester, et al., ""Are You With Me?"—Using Accelerometers to Determine if Two Devices are Carried by the Same Person", In Proceedings of Second International Conference on Pervasive Computing, Apr. 21, 2004, 18 pages.

Li, et al., "Experimental Analysis of Mode Switching Techniques in Pen-Based User Interfaces", In Proceedings of the SIGCHI Conference on Human Factors in Computing Systems, Apr. 2, 2005, 10 pages.

Ramos, et al., "Pressure Widgets", In Proceedings of the SIGCHI Conference on Human Factors in Computing Systems, vol. 6, Issue 1, Apr. 24, 2004, 8 pages.

Ramos, et al., "Tumble! Splat! Helping Users Access and Manipulate Occluded Content in 2D Drawings", In Proceedings of the Working Conference on Advanced Visual Interfaces, May 23, 2006, 8 pages.

Sachs, et al., "3-Draw: A Tool for Designing 3D Shapes", In Journal of IEEE Computer Graphics and Applications, vol. 11, Issue 6, Nov. 1991, 9 pages.

Schmidt, et al., "PhoneTouch: A Technique for Direct Phone Interaction on Surfaces", In Proceedings of the 23nd Annual ACM Symposium on User Interface Software and Technology, Oct. 3, 2010, 4 pages.

Subramanian, et al., "Multi-layer interaction for digital tables," In Proc. of the 19th Annual ACM Symposium on User Interface Software and Technology, Oct. 15, 2006, pp. 269-272.

Suzuki, et al., "Stylus Enhancement to Enrich Interaction with Computers", In Proceedings of the 12th International Conference on Human-Computer Interaction: Interaction Platforms and Techniques, Jul. 22, 2007, 10 pages.

Tian, et al., "The Tilt Cursor: Enhancing Stimulus-Response Compatibility by Providing 3D Orientation Cue of Pen", In Proceedings of the SIGCHI Conference on Human Factors in Computing Systems, Apr. 28, 2007, 4 pages.

Tian, et al., "Tilt Menu: Using the 3D Orientation Information of Pen Devices to Extend the Selection Capability of Pen-based User Interfaces", In Proceedings of the SIGCHI Conference on Human Factors in Computing Systems, Apr. 5, 2008, 10 pages.

"TouchPaint.java", The Android Open Source Project, 2007.

"Using Windows Flip 3D", retrieved at <<http://windows.microsoft.com/en-US/windows-vista/Using-Windows-Flip-3D>>, retrieved on Feb. 9, 2012, Microsoft Corporation, Redmond, WA, 1 page.

Verplaetse, C., "Inertial Proprioceptive Devices: Self-Motion-Sensing Toys and Tools", In IBM Systems Journal, vol. 35, Issue 3-4, Apr. 23, 2013, 12 pages.

Wilson, et al., "XWand: UI for Intelligent Spaces", In Proceedings of the SIGCHI Conference on Human Factors in Computing Systems, Apr. 5, 2003, 8 pages.

Wu, et al., "Gesture Registration, Relaxation, and Reuse for Multi-Point Direct-Touch Surfaces", In Proceedings of the First IEEE International Workshop on Horizontal Interactive Human-Computer Systems, Jan. 5, 2006, 8 pages.

Yee, Ka-Ping, "Two-Handed Interaction on a Tablet Display", In Proceedings of Extended Abstracts on Human Factors in Computing Systems, Apr. 24, 2004, 4 pages.

Zelenik, et al., "Hands-On Math: A Page-Based Multi-Touch and Pen Desktop for Technical Work and Problem Solving", In Proceedings of the 23nd Annual Symposium on User Interface Software and Technology, Oct. 3, 2010, 10 pages.

Figueroa-Gibson, G., U.S. Office Action, U.S. Appl. No. 12/970,943, Jun. 10, 2013.

Ilya Traktovenko, U.S. Office Action, U.S. Appl. No. 12/970,945, Apr. 22, 2013.

Traktovenko, Ilya, U.S. Notice of Allowance, U.S. Appl. No. 12/970,945, Jul. 10, 2013.

Figueroa-Gibson, G., U.S. Office Action, U.S. Appl. No. 12/970,939, Jun. 5, 2013.

Figueroa-Gibson, G., U.S. Office Action, U.S. Appl. No. 12/970,939, Aug. 22, 2013.

Figueroa-Gibson, G., U.S. Office Action, U.S. Appl. No. 12/970,949, Jun. 21, 2013.

Treitler, D., U.S. Office Action, U.S. Appl. No. 13/327,794, Aug. 16, 2013.

Figueroa-Gibson, Gloryvid, U.S. Final Office Action, U.S. Appl. No. 12/970,949, Aug. 15, 2014, pp. 1-21.

Figueroa-Gibson, Gloryvid, U.S. Office Action, U.S. Appl. No. 12/970,943, Sep. 17, 2014, pp. 1-20.

Figueroa-Gibson, Gloryvid, U.S. Office Action, U.S. Appl. No. 12/970,939, Oct. 2, 2014, pp. 1-40.

Zhou, Hong, Notice of Allowance, U.S. Appl. No. 13/026,058, Jul. 17, 2014, pp. 1-5.

Treitler, Damon, U.S. Office Action, U.S. Appl. No. 13/327,794, Jul. 17, 2014, pp. 1-13.

Zhou, Hong, Notice of Allowance, U.S. Appl. No. 13/026,058, Nov. 7, 2014, pp. 1-5.

Treitler, Damon, U.S. Final Office Action, U.S. Appl. No. 13/327,794, Nov. 20, 2014, pp. 1-13.

Geisy, Adam, U.S. Final Office Action, U.S. Appl. No. 13/367,377, Jul. 1, 2014, pp. 1-12.

Geisy, Adam, Notice of Allowance, U.S. Appl. No. 13/367,377, Oct. 27, 2014, pp. 1-10.

(56) References Cited

OTHER PUBLICATIONS

Figueroa-Gibson, Gloryvid, U.S. Notice of Allowance, U.S. Appl. No. 12/970,943, Dec. 19, 2014, pp. 1-10.
Figueroa-Gibson, Gloryvid, U.S. Notice of Allowance, U.S. Appl. No. 12/970,939, Dec. 19, 2014, pp. 1-10.
Zhou, Hong, U.S. Office Action, U.S. Appl. No. 13/903,944, Mar. 27, 2015, pp. 1-23.
Figueroa-Gibson, Gloryvid, U.S. Office Action, U.S. Appl. No. 12/970,949, Jan. 2, 2015, pp. 1-24.
Figueroa-Gibson, Gloryvid, U.S. Final Office Action, U.S. Appl. No. 12/970,949, Jun. 10, 2015, pp. 1-25.
Zhou, Hong, U.S. Notice of Allowance, U.S. Appl. No. 13/903,944, Jul. 20, 2015, pp. 1-5.
Zhou, Hong, U.S. Notice of Allowance, U.S. Appl. No. 13/903,944, Aug. 3, 2015, pp. 1-2.
McLoone, Peter D., U.S. Office Action, U.S. Appl. No. 14/303,234, Oct. 15, 2015, pp. 1-16.

\* cited by examiner

TOUCH AND STYLUS DISCRIMINATION AND REJECTION FOR CONTACT SENSITIVE COMPUTING DEVICES

CROSS-REFERENCE TO RELATED APPLICATIONS

This application is also a Continuation-in-Part (CIP) of U.S. patent application Ser. No. 12/970,945, filed on Dec. 17, 2010, by Hinckley, et al., and entitled "DETECTING AND RESPONDING TO UNINTENTIONAL CONTACT WITH A COMPUTING DEVICE," the subject matter of which is incorporated herein by this reference.

This application is a Continuation-in-Part (CIP) of U.S. patent application Ser. No. 12/970,943, filed on Dec. 17, 2010, by Hinckley, et al., and entitled "USING MOVEMENT OF A COMPUTING DEVICE TO ENHANCE INTERPRETATION OF INPUT EVENTS PRODUCED WHEN INTERACTING WITH THE COMPUTING DEVICE," the subject matter of which is incorporated herein by this reference.

This application is also a Continuation-in-Part (CIP) of U.S. patent application Ser. No. 13/026,058 filed on Feb. 11, 2011, by Hinckley, et al., and entitled "MULTI-TOUCH INPUT DEVICE WITH ORIENTATION SENSING," the subject matter of which is incorporated herein by this reference.

BACKGROUND

Many handheld computing devices allow users to input information by making direct contact with the display surfaces of the devices using either fingers (i.e., "touch input" or "touch-based input") or stylus-type input devices. Some computing devices furthermore permit use of distinct or tagged physical objects, including pucks, specialized tools such as brushes or airbrushes, mobile devices, toys, and other physical icons or tangible props. These types of input mechanisms are collectively referred to herein as contact-type input mechanisms.

For example, typical touch-based input mechanisms generally respond to direct touch inputs when a user touches a display surface of the computing device with one or more fingers. Similarly, typical pen- or stylus-based input mechanisms respond to direct pen or stylus input events when a user contacts the display surface with a pen or stylus device.

Unfortunately, both of these types of interface mechanisms introduce a number of challenges. For instance, consider the case in which a computing device allows a user to input information using both a touch input mechanism and a pen input mechanism. In the course of applying a mark on the display surface with a pen device, the user may inadvertently rest his or her palm (or other portion of the hand or wrist) on the display surface. The computing device may then incorrectly interpret this inadvertent palm contact as legitimate input activity, thereby causing potentially unwanted behavior by the computing device. A similar challenge may confront a user who is intentionally using the touch input mechanism. The user may attempt to apply a focused touch to a target object presented on the display surface, yet the user may accidently brush or bump his or her hand (or a pen or stylus device held in that same hand) against other parts of the display surface, causing accidental input events. Workflow disruptions to the user resulting from such problems may understandably frustrate the user whenever they occur.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Further, while certain disadvantages of prior technologies may be noted or discussed herein, the claimed subject matter is not intended to be limited to implementations that may solve or address any or all of the disadvantages of those prior technologies.

In general, a "Contact Discriminator," as described herein, provides various techniques for differentiating between intentional user touches (including gesture type touches) or contacts and unintentional user touches or contacts on contact-sensitive computing devices. More specifically, the Contact Discriminator provides a variety of techniques that discriminate between, or assign gradated probabilities to, one or more single, sequential, or concurrent valid user contacts and invalid or inadvertent contacts, received from any of a variety of contact-based input mechanisms (e.g., finger or skin based touches, pen or stylus-based inputs, hover-type inputs, etc.).

In other words, given a contact-sensitive computing device that is capable of responding to single, sequential, or concurrent user finger-touch inputs, and/or pen or stylus contacts or inputs, and/or hover-type inputs, the Contact Discriminator is capable of discriminating between valid touch, stylus, or hover inputs received from any input methodology, as distinct from invalid or inadvertent inputs. The Contact Discriminator then acts on one or more concurrent or simultaneous inputs determined to be valid while rejecting, ignoring, or deprecating invalid or suspect inputs. Note that under some embodiments, certain input may be simultaneously partially valid and invalid in a probabilistic sense, or possibly depending on the end-user application semantics of the touch. Hence, "rejected" inputs may nonetheless be propagated to end-user applications for further processing, but tagged appropriately as "palm-type inputs" with a given probability. Again, note that palm-type inputs may be received from any portion of the user's hand.

As discussed in further detail throughout this document, various examples of usage scenarios for the Contact Discriminator for enhancing user experience with touch-sensitive computing devices include, but are not limited to:

Input surface sub-region contact rejection (also referred to herein as "palm-rejection");

Concurrent or simultaneous finger-touch and pen use in different hands;

Concurrent or simultaneous pen use in each hand;

Input from a hand holding a pen can be rejected while input from the other hand is accepted;

Input from a hand not holding a pen can be rejected while pen input from the other hand is accepted;

Both pen and hand can be rejected or accepted concurrently;

Concurrent or simultaneous multiple users and multiple pens on a large screen;

Per-user pen processing with per-user input surface sub-region rejection profiles;

Automatic left vs. right hand differentiation;

Input surface sub-region contact rejection (i.e., palm-rejection) coupled with any of the aforementioned examples; and Differentiation of palm rejection algorithm based on type of computing device (e.g., e-reader vs. slate vs. dual-screen booklet vs. horizontal surface vs. wall-mounted display, etc.) as well as the specific sensing properties and capabilities of the touch, stylus, and other input modalities.

In view of the above summary, it is clear that the Contact Discriminator described herein provides various techniques for differentiating between intentional user contacts and unintentional user contacts on contact-sensitive computing devices. In addition to the just described benefits, other advantages of the Contact Discriminator will become apparent from the detailed description that follows hereinafter when taken in conjunction with the accompanying drawings.

DESCRIPTION OF THE DRAWINGS

The specific features, aspects, and advantages of the claimed subject matter will become better understood with regard to the following description, appended claims, and accompanying drawings where:

DETAILED DESCRIPTION OF THE EMBODIMENTS

Figure 1:
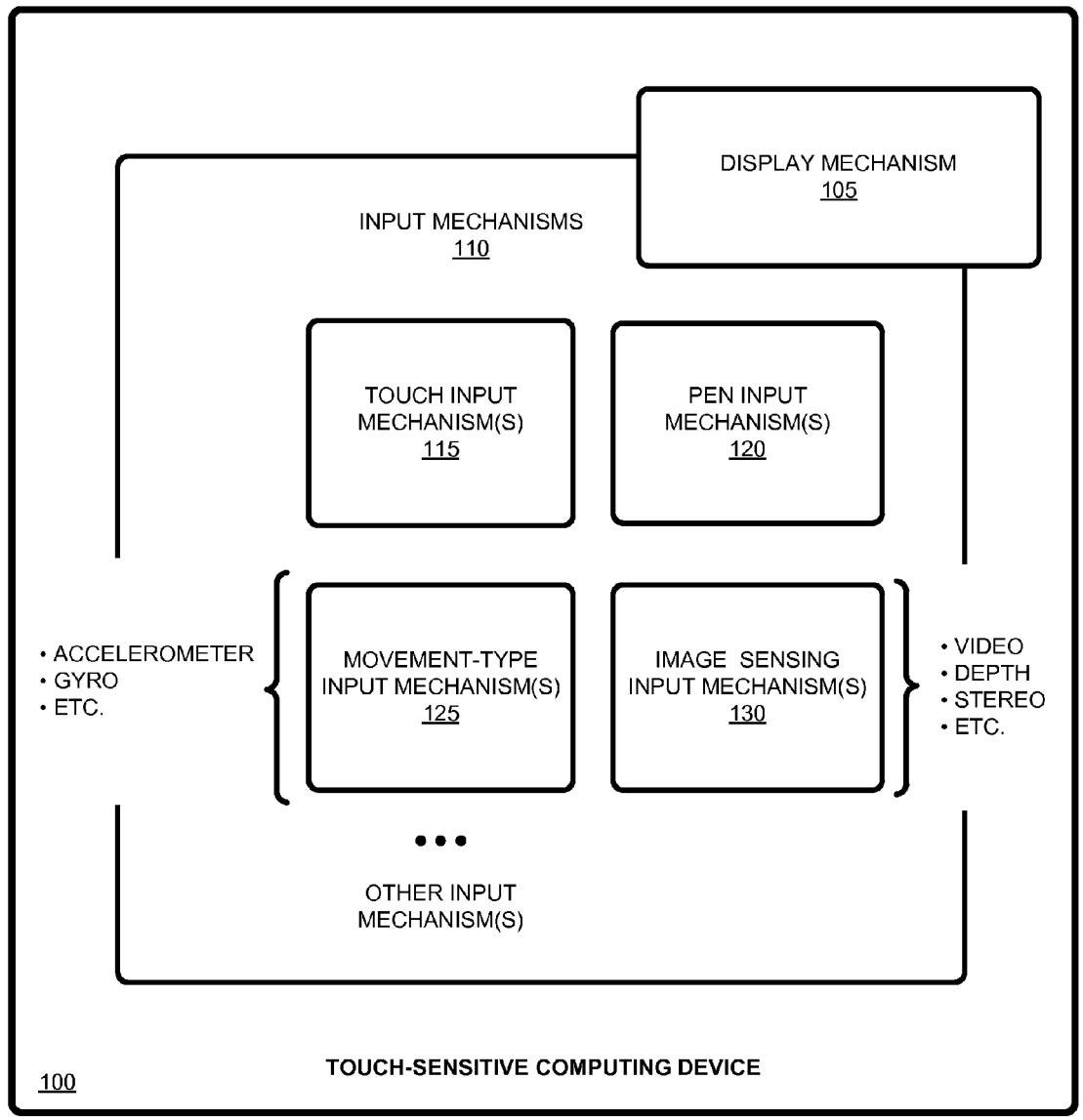
FIG. 1 illustrates an exemplary touch-sensitive computing device capable of being controlled by a "Contact Discriminator", as described herein.

In the following description of the embodiments of the claimed subject matter, reference is made to the accompanying drawings, which form a part hereof, and in which is shown by way of illustration specific embodiments in which the claimed subject matter may be practiced. It should be understood that other embodiments may be utilized and structural changes may be made without departing from the scope of the presently claimed subject matter.

1.0 Introduction:

In general, a "Contact Discriminator," as described herein, provides various techniques for differentiating between valid and invalid contacts received from any input methodology by one or more touch-sensitive surfaces of a touch-sensitive computing device. Examples of contacts include single, sequential, concurrent, or simultaneous user finger touches (including gesture type touches), pen or stylus touches or inputs, hover-type inputs, or any combination thereof. The Contact Discriminator then acts on valid contacts (i.e., contacts intended as inputs) while rejecting or ignoring invalid contacts or inputs.

Advantageously, the Contact Discriminator is further capable of disabling or ignoring one or more regions or sub-regions of input surfaces that are expected to receive unintentional contacts, or intentional contacts not intended as inputs, for device or application control purposes. Examples of contacts not intended as inputs include, but are not limited to, a user's palm resting on a touch screen while the user writes on that screen with a stylus or pen.

Note that disabled or rejected sub-regions of the input surface are also referred to herein using the term "palm-rejection" region. Note further that in some embodiments "disabled" regions may still report input, but said input will be appropriately tagged (or its interpretation altered) so as to fully and properly account for the likelihood that it may represent unintended input. Hence, such altered interpretation might still employ such input as contextual data or in support of other application or system behaviors or feedback that differ, perhaps even quite subtly, from normal system operation without "palm rejection." Furthermore such responses may be gradated based on the probability that said input represents an incidental input, such that the system concurrently propagates both "intended" and "unintended" interpretations of an input during periods of uncertainty. Such propagated inputs can then be reversed or undone, if necessary, if the Contact Discriminator makes a final determination as to the validity of such contacts. Note also that the concept of a "latency period" as discussed in further detail herein is used in various embodiments to enable these concepts.

The Contact Discriminator is adaptable for use with any touch-sensitive computing device having one or more touch-sensitive surfaces or regions (e.g., touch screen, touch sensitive bezel or case, sensors for detection of hover-type inputs, optical touch sensors, etc.). Examples of touch-based computing devices include, but are not limited to, touch-sensitive display devices connected to a computing device, touch-sensitive phone devices, touch-sensitive media players, touch-sensitive e-reader, notebook, netbook, booklet (dual-screen), or tablet type computers, or any other device having one or more touch-sensitive surfaces or input modalities. In particular, note that the touch-sensitive region of said devices need not necessarily be associated with a display, and furthermore that the location or type of contact-sensitive region (e.g. front of a device on the display, vs. back of device without any associated display) may be used as a parameter to modulate palm-rejection handling for said input surface.

For example, FIG. 1 illustrates a simplified touch-sensitive computing device 100 adapted for use with the Contact Discriminator by simply running the Contact Discriminator as any combination of firmware, software, drivers, programs modules, etc., on the touch-sensitive computing device. When any computing device is under the control or operation of the Contact Discriminator, the Contact Discriminator receives input events from one or more input mechanisms 110 of the computing device. The Contact Discriminator then determines which of those input events are valid, and which are invalid. The Contact Discriminator then acts in accordance with that determination, as discussed in further detail herein.

In general, the computing device 100 optionally includes a display mechanism 105 in conjunction with various input mechanisms 110. The display mechanism 105 provides a visual rendering of digital information on a display surface. The display mechanism 105 can be implemented by any type of display, such as a liquid crystal display, organic LED display, etc. Although not shown, the computing device 100 can also include an audio output mechanism, a haptic (e.g., vibratory) output mechanism, etc.

The input mechanisms 110 can include touch input mechanism(s) 115 and pen input mechanism(s) 120. The touch input mechanism(s) 115 can be implemented using any desired technology, including, but not limited to, a resistive touch screen technology, capacitive touch screen technology, acoustic touch screen technology, bi-directional touch screen technology, optical sensor technology, etc. In general, any input mechanism or device can be connected to a computing device or input surface using any desired wired or wireless technology, including, but clearly not limited to, USB, various low-powered radio technologies such as Bluetooth, inductive or optical coupling, etc.

In bi-directional touch screen technology, a display mechanism provides elements devoted to displaying information and elements devoted to receiving information. Thus, a surface of a bi-directional display mechanism is also a capture mechanism. The touch input mechanism(s) 115 and the pen input mechanism(s) 120 can also be implemented using a pad-type input mechanism that is separate from (or at least partially separate from) the display mechanism 105. A pad-type input mechanism is also referred to as a tablet, a digitizer, a graphics pad, etc., including desktop contact-sensitive surfaces that are employed in conjunction with a (possibly separate) display.

The pen input mechanism(s) 120 can be implemented using any desired technology, including, but not limited to, passive pen technology, active pen technology, etc. In the passive case, the computing device 100 detects the presence of the pen device when it touches (or is proximal to) the display surface.

As a passive device, the pen is generally a hand-held implement of any desired shape having no independent power source and no processing functionality. Alternately, the pen may be passively powered by inductive coupling with the display mechanism 105.

In the active case, the pen device can incorporate independent detection functionality for sensing its position with respect to the display surface. Further, the active pen device can include independent movement sensing mechanisms. Further, the active pen device can include independent depth sensing mechanisms, such as a beacon that measures a distance of the pen device from the computing device 100. In these examples, the active pen device can forward its input data to the computing device 100 for analysis by the Contact Discriminator. In the following description, it is to be understood that input data regarding the pen device can originate from the computing device 100, the pen device itself, or a combination thereof.

The input mechanisms 110 also include various types of movement-type input mechanism(s) 125. The term movement-type input mechanism describes any type of input mechanism that measures the orientation or motion of the computing device 100, the pen, or both. The movement type input mechanism(s) 125 can be implemented using linear accelerometers, gyroscopic sensors, magnetometers, vibratory sensors tuned to various motion frequency bandwidths, mechanical means to detect specific postures or movements of the computing device 100 (or parts of the computing device) relative to gravity, torque sensors, strain gauges, flex sensors, optical encoder mechanisms, etc. Note that common IMU's (Inertial Measurement Units) include accelerometers, gyroscopes, and magnetometers in a single compact unit. This enables all of the information from these sensors to be integrated into a common inertial frame. Further, any movement-type input mechanism can sense movement along any number of spatial axes. For example, the computing device 100 can incorporate an accelerometer and/or a gyroscopic sensor device that measures movement along three spatial axes.

The input mechanisms 110 can also include any type of image sensing input mechanism(s) 130, such as a video capture input mechanism, a stereo image capture mechanism, etc. The input mechanisms 110 can also include one or more depth sensing mechanisms, some of which can be implemented by image sensing input mechanism(s) 130 (and some of which can be implemented within the pen device itself, as noted above). A depth sensing mechanism measures the distance of objects from some part of the computing device 100. For example, in one case, a depth sensing mechanism measures the distance of objects from the display surface of the computing device 100. A depth sensing mechanism can be implemented using any type of capture technology (e.g., time-of-flight technology) in conjunction with any type of electromagnetic radiation (e.g., visible spectrum radiation, infrared spectrum radiation, etc.). The realm of depth sensing mechanisms may therefore encompass some of the image sensing input mechanism(s) 130.

More specifically, some of the depth sensing mechanisms can provide a general indication that some object is located above the display surface (or other part of the computing device 100). In other words, this depth sensing capability can be used for hover detection purposes (i.e., pen or finger hovering above input surface). Other of the depth sensing mechanisms can determine a general (aggregate) indication of a distance of the object from the display surface. Other of the depth sensing mechanisms can assess the distance in a more fine-grained manner, such as by providing a per-pixel indication of the distance of the object above the display surface, etc.

Although not specifically illustrated in FIG. 1, other input mechanisms can include a keypad input mechanism, a mouse input mechanism, a voice input mechanism, etc.

Finally, note that FIG. 1 depicts the input mechanisms 110 as partially overlapping the display mechanism 105. This is because at least some of the input mechanisms 110 may be integrated with functionality associated with the display mechanism 105. This is the case with respect to the touch input mechanism(s) 115 and the pen input mechanism(s) 120. For example, the touch input mechanism(s) 115 relies, in part, on functionality provided by the display mechanism 105.

1.1 General Considerations and Definitions:

Note that the term "finger touch" as used throughout this document will generally refer to input received from touches by the user's hands, palms, fingers, or other body parts on a touch-sensitive surface of a touch-sensitive computing device. In some embodiments, this may include contact from a gloved hand or otherwise clothed body part.

Further, in various examples described herein, the term "hand portion" or "palm rejection" will be used in reference to contacts (generally, but not necessarily unintentional) by any one or more parts of either or both hands, including one or more fingertips, the palm, the knuckles of the hand, the side of a finger, the wrist or forearm, etc.

Note also that inadvertent inputs or contacts resulting from touches by user clothing or accessories (e.g., user's shirtsleeve, dangling bracelet, etc.) on any touch sensitive surface are also considered by the "Contact Discriminator" for validation or acceptance in a manner similar to the evaluation of contacts made by any hand portion.

Touches or inputs received from other input devices such as a pen or stylus will generally be referred to in the context of a "stylus touch," a "pen touch," or the like. In addition, rather than describe all pen or stylus type input devices, for purposes of explanation, the term "pen" will generally be used herein to refer to all types of handheld mechanical devices that allow contact-based input to be provided to touch-sensitive surfaces or displays.

Further, the term "contact" will generally be used to refer to touches received from any input source, including finger or hand touch inputs (or accidental clothing touch type inputs), pen or stylus touch inputs, hover-based inputs, tagged objects and physical props planed in contact with the input surface, etc.

1.2 Introductory Example:

As noted above, the Contact Discriminator provides a variety of techniques that discriminate between valid user contacts, and invalid or inadvertent contacts resulting from any touch- or hover-based input source. Examples of such contacts include user finger touches (including gesture type touches), pen or stylus touches or inputs, hover-type inputs, or any combination thereof. The Contact Discriminator then acts on contacts determined to be valid inputs while rejecting or ignoring invalid contacts or inputs.

Advantageously, these discrimination capabilities enable the Contact Discriminator to respond to any combination of single, concurrent, simultaneous, or sequential stylus and touch inputs that are deemed valid. Further, in various embodiments, the Contact Discriminator disables or ignores one or more regions or sub-regions of input surfaces that are likely to include inadvertent or unintended contacts. A simple example of this concept is to automatically disable or ignore inputs from a region of screen around user's palm resting on the input screen while writing on other regions of that screen with a pen type input device.

In other words, in various embodiments, the Contact Discriminator allows actions such as enabling the user to provide concurrent input using multiple pens, or a combination of a pen and finger using different hands. Further, the user can hold a touch-sensitive surface of a tablet or slate type device in one hand while the Contact Discriminator ignores inputs from that hand and concurrently accepts input from fingers the other hand, or from a pen held in the other hand. Note that these simple examples are not intended to limit the scope of the Contact Discriminator, and that a wide range of additional capabilities and embodiments are described throughout this document.

For example, when writing on a touch screen using a stylus or the like, most users will grip the stylus against the thumb and two fingers relatively near the tip. This can be detected via capacitive proximity or force sensors. When this grip is detected and the stylus is in proximity of the writing surface, the Contact Discriminator makes a determination that user is probably trying to write, and that finger touches should be rejected. However, if the stylus is nearby, but a writing grip is not detected, the Contact Discriminator instead allows user finger touch input while rejecting stylus input.

Further, when a user switches from writing with a stylus to touching with the same hand, they usually change both their grip on the stylus, and change the orientation of the stylus relative to the writing surface. In various embodiments, these actions are captured by using a variety of sensors (e.g., pressure or force sensors, accelerometers, orientation or angle sensors, capacitive proximity sensors, etc.) to detect either or both of these changes.

Figure 2:
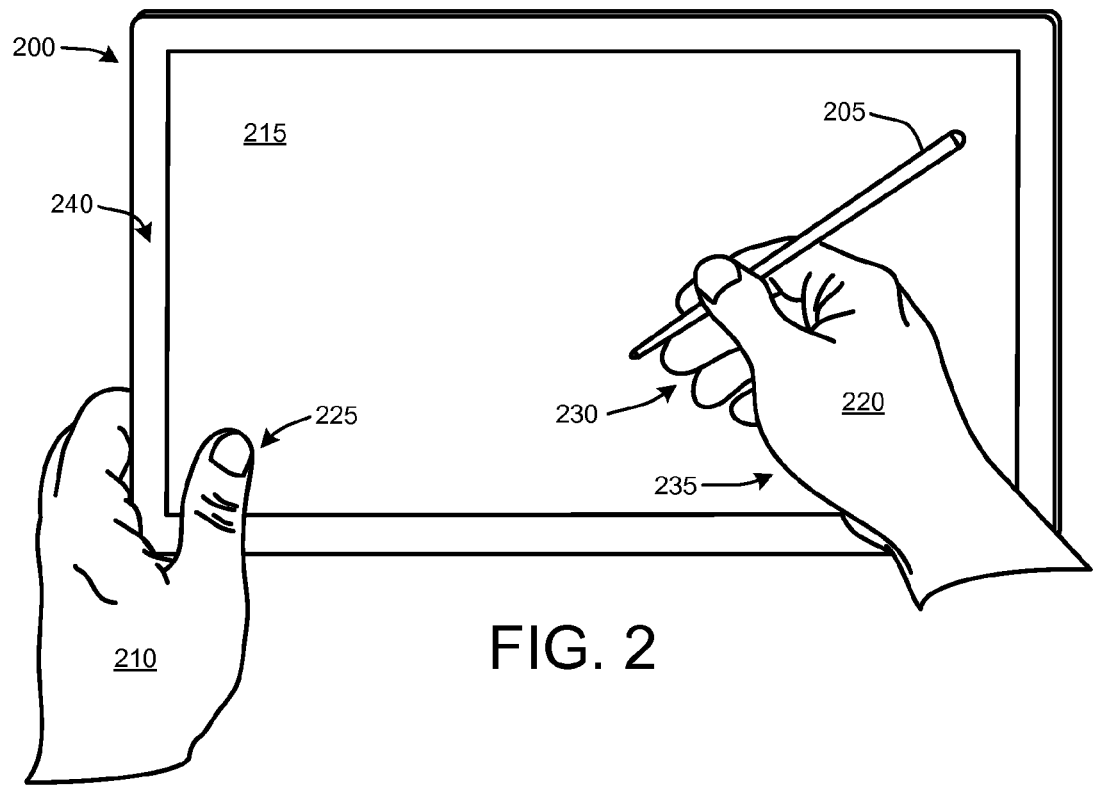
FIG. 2 illustrates an example of using a "Contact Discriminator" to differentiate between intended touch inputs and unintended touch inputs by a user holding a touch-sensitive computing device in one hand while providing a stylus-based input to that device via a pen or stylus held in the other hand, as described herein.

Advantageously, as noted above, the Contact Discriminator allows the use of a stylus in one hand while concurrently or simultaneously accepting, or ignoring, finger touch with the other hand. For example, FIG. 2 illustrates a user interacting with a touch sensitive tablet-type computing device 200 using a stylus 205. In this example, the user is gripping the computing device 200 with his left hand 210 while holding the stylus 205, which is in contact with a touch-screen 215 of the computing device, in his right hand 220.

Note that in this example, the user's left thumb 225 is in direct contact with the touch screen 215. Further, portions of the user's right hand 220, including several fingers 230 and a portion of the user's palm 235 are also in contact with the touch screen 215. In addition, in this example, portions of the bezel 240, and/or back (not shown) of the computing device 200, may also be touch sensitive. In this case, portions of the user's left hand 210 are shown as being in contact with the touch sensitive bezel 240 and back (not shown) of the computing device 200.

In view of this example showing multiple concurrent potentially valid contacts or inputs, the Contact Discriminator is capable of determining which contacts on various portions of the computing device 200 represent valid user inputs, and which contacts represent invalid or inadvertent input. Specifically, in this example, the Contact Discriminator will respond to input from the stylus 205 while rejecting contacts on touch screen 215 from any portion of either of the user's hands 210 and 220, and while further rejecting touch input on the bezel 240.

Note that FIG. 2 is merely one example of a wide variety of touch discrimination scenarios enabled by the Contact Discriminator that are discussed throughout this document. For example, in various embodiments, the Contact Discriminator considers single, sequential, concurrent, or simultaneous input from multiple sources, e.g., two or more fingers, combinations of fingers and stylus, inputs from multiple concurrent users, etc. In the case of stylus or pen use, various factors considered by the Contact Discriminator in determining which inputs are valid include, but are not limited to, user grip on the stylus, orientation and/or proximity (i.e., hover) of the stylus relative to the computing device or a touch screen of the computing device, etc. Techniques for enabling these and other contact discrimination abilities are discussed in further detail throughout Section 2 of this document, and in view of one or more of the co-pending U.S. Patent Applications identified below.

1.3 Co-Pendinq U.S. Patent Applications:

Various embodiments of the Contact Discriminator described herein make use of and further adapt the techniques for detecting and responding to unintentional contact with a computing device described in co-pending U.S. patent application Ser. No. 12/970,945. In general, co-pending U.S. patent application Ser. No. 12/970,945 provides various techniques for detecting and addressing unintended contact of a hand portion (such as a palm) or other article (such as a pen or stylus) with a touch sensitive surface or display of a computing device. The described techniques use multiple factors to determine whether input events are accidental or unintentional. Such factors include, but are not limited to, the tilt of a pen device in a user's hand as it approaches the touch-sensitive display surface of the computing device. The described techniques also address the capture and analysis of the validity of input events that represent fingers, hands, or portions thereof, that are in contact with, or close proximity to, the display surface. Such techniques allow the Contact Discriminator described herein to perform actions such as, for example, disabling or ignoring input caused by the user resting her palm on the screen while writing on that same screen with a stylus (e.g., see FIG. 4, discussed below).

In addition, various embodiments of the Contact Discriminator described herein make use of and further adapt the techniques for using the movement of a computing device to enhance the interpretation of input events produced when interacting with the computing device described in co-pending U.S. patent application Ser. No. 12/970,943. In general, co-pending U.S. patent application Ser. No. 12/970,943 provides various techniques for receiving one or more input events from at least one contact-type input mechanism, such as a touch input mechanism and/or a pen input mechanism. The described techniques also receive one or more input events from at least one movement-type input mechanism, such as an accelerometer and/or gyro device. The movement-type input mechanism indicates the orientation or dynamic motion of the computing device. Based on these and optionally other input events, the described techniques provide an interpretation of the type of the input action that has occurred. This interpretation is then used to execute a desired behavior, such as ignoring at least part of the input events. Such techniques allow the Contact Discriminator described herein to perform actions such as, for example, disabling or ignoring unintended inputs caused by user contact or proximity to touch-sensitive computing devices, as discussed in further detail herein.

Finally, various embodiments of the Contact Discriminator described herein make use of and further adapt the techniques for using a multi-touch input device that is equipped with an orientation sensor to perform multiple tasks relative to a touch-sensitive computing device as described in co-pending U.S. patent application Ser. No. 13/026,058. In general, co-pending U.S. patent application Ser. No. 13/026,058 describes a multi-touch input device (such as a modified pen or stylus type device) that is equipped with an orientation sensor that senses different orientations and a multi-touch sensor that senses different handgrips on the input devices. Thus, depending on the particular device orientation and hand or finger grip pattern on the device, the input device may perform different functions for different electronic devices or different applications. Such techniques allow the Contact Discriminator described herein to perform actions such as, for example, disabling or ignoring unintended inputs caused by unintended contact or hover of a pen or stylus relative to touch-sensitive computing devices, as discussed in further detail herein.

1.4 System Overview:

As noted above, the "Contact Discriminator," provides various techniques for differentiating between, and acting on, intentional and unintentional contacts on one or more input surfaces of contact-sensitive computing devices. The processes summarized above are illustrated by the general system diagram of FIG. 3. In addition, it should be understood that various capabilities of the Contact Discriminator described with respect to FIG. 3, and throughout this document, are intended to be understood in view of one or more of the aforementioned co-pending U.S. Patent Applications.

Figure 3:
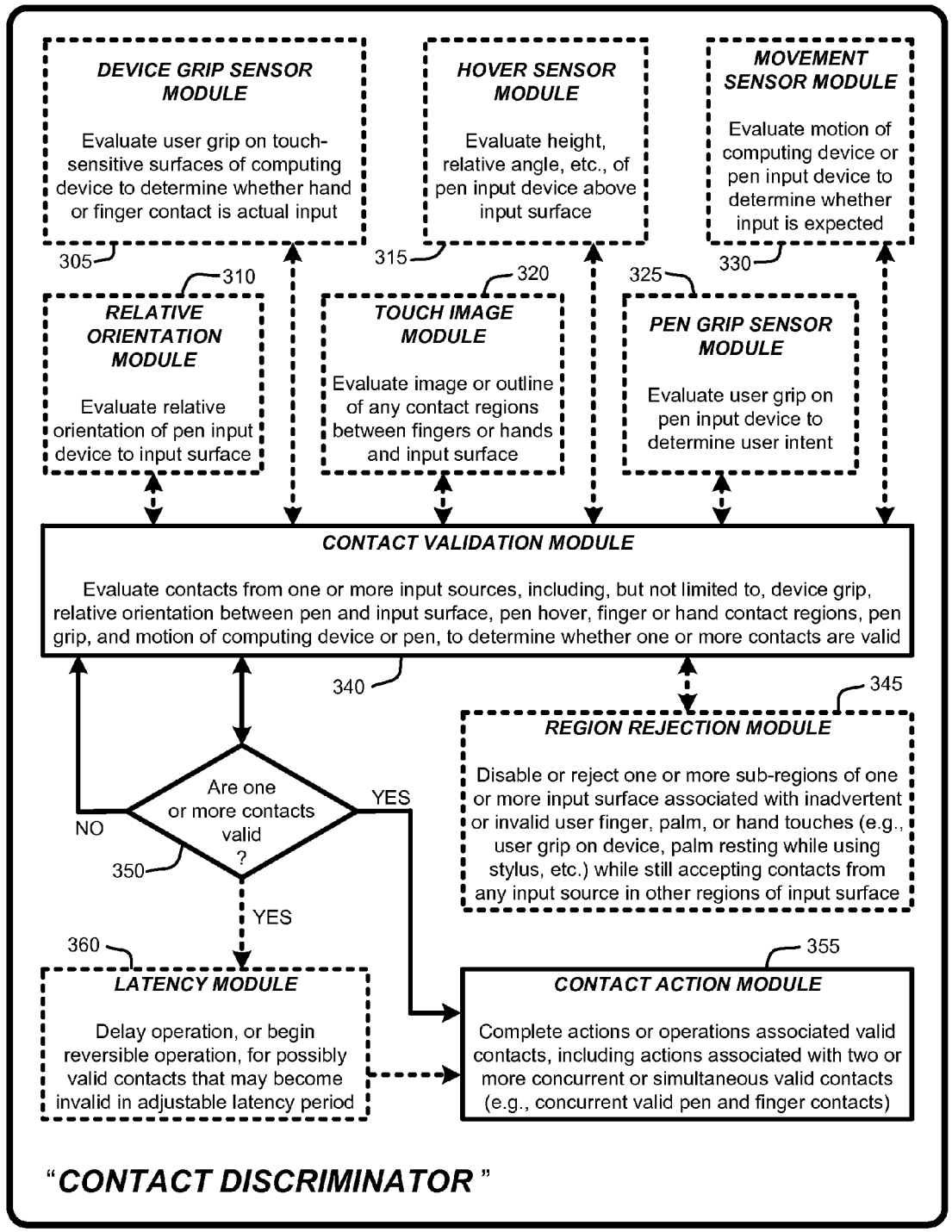
FIG. 3 illustrates an exemplary architectural flow diagram that illustrates program modules for differentiating between intentional user contacts and unintentional user contacts on one or more contact-sensitive surfaces of a computing device using the "Contact Discriminator," as described herein.

In particular, the system diagram of FIG. 3 illustrates the interrelationships between program modules for implementing various embodiments of the Contact Discriminator, as described herein. Furthermore, while the system diagram of FIG. 3 illustrates a high-level view of various embodiments of the Contact Discriminator, FIG. 3 is not intended to provide an exhaustive or complete illustration of every possible embodiment of the Contact Discriminator as described throughout this document.

In addition, it should be noted that any boxes and interconnections between boxes that may be represented by broken or dashed lines in FIG. 3 represent alternate embodiments of the Contact Discriminator described herein, and that any or all of these alternate embodiments, as described below, may be used in combination with other alternate embodiments that are described throughout this document.

In general, as illustrated by FIG. 3, the Contact Discriminator uses a combination of one or more sensing modalities to determine whether one or more contacts are valid. Valid contacts are then acted on to complete or initiate one or more actions or operations by the computing device.

More specifically, as illustrated by FIG. 3, sensing modalities considered by the Contact Discriminator include, but are not limited to, a device grip sensor module 305, a relative orientation module 310, a hover sensor module 315, a touch image module 320, a pen grip sensor module 325, and a movement sensor module 330.

The device grip sensor module 305 generally evaluate user grip on touch-sensitive surfaces of computing device to determine whether hand or finger contact is actual input. For example, in view of FIG. 2, if a user is holding a touch sensitive device in one hand while providing input to the device with the other hand (or a pen or stylus in the other hand), the device grip sensor module 305 will determine that any contacts resulting from the hand holding the computing device are to be ignored or rejected. Various techniques for evaluating user grip on the computing device are described in one or more of the aforementioned co-pending U.S. Patent Applications.

The relative orientation module 310 generally evaluates relative orientation of pen input type devices to the input surface of a computing device. Relative orientation is a useful indicator for determining whether the user intends to use the pen for input or whether the user is merely holding the pen while performing other actions. For example, a pen being held relatively perpendicular to the input surface is more likely to be used for input than a pen being held at some other angle relative to the input surface.

Various techniques for determining relative orientation are described in one or more of the aforementioned co-pending U.S. Patent Applications. Further, additional techniques for evaluating relative orientation between the pen input device and the input surface include evaluating the shape of field lines projected onto the input surface by the pen, as discussed below with respect to FIG. 6. For example, as discussed in further detail herein, circular projected field lines would correspond to a pen at 90-degrees to the input surface, while those field lines would become increasingly elliptical as the angle deviated from 90-degrees.

The hover sensor module 315 generally evaluates height, relative angle or orientation, etc., of a pen input device above the input surface. Hover distance is a useful indicator for determining whether the user intends to use the pen for input or whether the user is merely holding the pen while performing other actions. Further, the Contact Discriminator is also capable of acting on hover-based inputs as a function of pen distance above the input surface. A simple example of this idea is to increase line weight for a sketch-type application as the pen gets closer to the input surface. Alternately, as discussed in further detail in Section 2.5, the Contact Discriminator can use two or more hover height levels to cause the computing device to perform different actions depending upon the height of the pen or finger above the input surface.

Various techniques for determining hover distance or height, and relative angle or orientation, are described in one or more of the aforementioned co-pending U.S. Patent Applications. Further, as noted above, additional techniques for evaluating relative orientation between the pen input device and the input surface include evaluating field lines projected onto the input surface by the pen. Note also that as discussed below with respect to FIG. 6, the size of projected field lines is directly proportional to the distance of the pen input device to the input surface, with the size of the projection decreasing as the pen approaches the input surface. Therefore, hover distance can be determined based on projected field size.

The touch image module 320 generally identifies and evaluates an image or outline of any contact regions between fingers or hands and the input surface of the computing device. Some such contacts are clearly intended to be valid user inputs. However, some such contacts may be invalid. For example, as discussed with respect to FIG. 2, portions of a user's fingers or palm may be in contact with the input surface while the user is writing on that surface with a pen input device. Clearly, in such cases, the user does not want to provide input with their palm since the intended input is via the pen device. The touch image module 320 determines any such regions of contact and allows the Contact Discriminator (via a region rejection module 345, discussed below) to ignore or disable inputs from invalid regions, and optionally from extended areas surrounding the current contact area. Various techniques for determining, and rejecting, palm or finger contact regions are described in one or more of the aforementioned co-pending U.S. Patent Applications.

The pen grip sensor module 325 generally evaluates user grip patterns on the pen input device to determine user intent. Such information is useful for determining whether the user intends to write with the pen on the input surface of the computing device. Further, user grip patterns on the pen input device allow the pen input device to be used as an input device without the pen touching the input surface. For example, user motion of a finger along the pen input device could be used as a scroll-type input event. Various techniques for determining, evaluating, and responding to user grip patterns on the pen input device are described in one or more of the aforementioned co-pending U.S. Patent Applications.

The movement sensor module 330 generally evaluates the motion of computing device or pen input device, or relative motion between those devices, to determine whether input is expected. Such techniques allow the Contact Discriminator described herein to perform actions such as, for example, disabling or ignoring unintended inputs caused by user contact or proximity to touch-sensitive computing devices, as discussed in further detail herein. Various techniques for determining, evaluating, and responding to the motion of either or both the computing device or pen input device are described in one or more of the aforementioned co-pending U.S. Patent Applications.

In general, the Contact Discriminator uses a contact validation module 340 to evaluate contacts and associated contextual information provided by one or more of the various sensing and input modalities described above (i.e., modules 305, 310, 315, 320, 325, 330) to determine whether one or more contacts are valid given the context associated with such inputs.

In various embodiments, this contact validity evaluation is capable of determining whether one or more contacts, or input received from one or more particular sub-regions of contact (see, for example, device grip sensor module 305 and touch image module 320), represent contacts not intended as user input. In such cases, the aforementioned region rejection module 345 disables or rejects one or more sub-regions of any input surface associated with inadvertent or invalid user finger, palm, or hand touches (e.g., user grip on device, palm resting while using stylus, etc.). Advantageously, even though one or more sub-regions of a touch-sensitive input surface may be disabled, the Contact Discriminator, via the contact validation module 340, is still capable of accepting and acting upon one or more single, sequential, concurrent, or simultaneous contacts occurring in other regions of the touch-sensitive input surface.

Regardless of whether any regions of the input surface have been disabled, if one or more contacts are deemed valid 350 by the contact validation module 340, the Contact Discriminator acts on those valid contacts by initiating or completing actions or operations associated with those valid contacts, including actions associated with two or more sequential, concurrent or simultaneous valid contacts. Examples of multiple valid contacts include, but are not limited to sequential or concurrent pen and finger contacts, simultaneous contacts from multiple users, etc.

Finally, in various instances, one or more contacts may initially appear to be valid contacts, such as, for example, a case where a user inadvertently contacts the touch-sensitive screen of a computing device with a stylus held in a typical writing orientation. Invalidity of such contacts may be determined after a relatively short time-frame or latency period, as discussed in further detail in Section 2.8, below. The Contact Discriminator addresses such cases using a latency module 360 to delay acting on particular contacts.

For example, touches sensed in a region around palm or finger contacts can be delayed by the latency module 360 because the user will often touch that surface with her palm or fingers as she brings her hand down to write on that surface with the pen. Thus, any initial touches that may have been falsely interpreted as valid finger touches by the contact validation module 340 are subsequently recognized as a "palm-rejection" region (see region rejection module 345) that are to be ignored by the Contact Discriminator. Such embodiments are enabled by using the latency module 360 to delay operation, or alternately, to reversibly begin operation, for possibly valid contacts that may be determined to be invalid within an adjustable latency period.

More specifically, the contact evaluation provided by the contact validation module 340 is continuous and dynamic such that Contact Discriminator can change its determination as to whether any particular touch or contact is good or bad at any time, depending upon what other input is being received. Therefore, when responding to potentially uncertain touches or contacts (e.g., probability of validity at or near a minimum validity threshold) the Contact Discriminator can respond by delaying operations, by initiating operations as a semi-transparent operation (e.g., move window, stretch window, rotate window, start application, close application, etc.). The Contact Discriminator can then make that operation solid or complete, or simply fade away or disappear if the contact validation module 340 determines that the touch or contact is not actually valid within the latency period enabled by the latency module 360.

2.0 Operational Details of the Contact Discriminator:

The above-described program modules are employed for implementing various embodiments of the Contact Discriminator. As summarized above, the Contact Discriminator provides various techniques for differentiating between intentional and unintentional contacts on various contact-sensitive surfaces of contact-sensitive computing devices.

The following sections provide a detailed discussion of the operation of various embodiments of the Contact Discriminator, and of exemplary methods for implementing the program modules described in Section 1 with respect to FIG. 1 through FIG. 3. Note that many of the techniques for enabling the discrimination capabilities of the Contact Discriminator are intended to be understood in view of one or more of the co-pending U.S. Patent Applications identified above in Section 1.3.

In particular, the following sections provides examples and operational details of various embodiments of the Contact Discriminator, including:

An operational overview of the Contact Discriminator;
Exemplary information considered by the Contact Discriminator;
Disabling or ignoring sub-regions of input surfaces;
Determining and evaluating relative orientation between the input surface of the slate or tablet (i.e., the touch-sensitive computing device) and pen input devices;
Pen or Stylus hover height and accuracy;
Leveraging combinations of pen grip sensing and relative orientations between the pen and the input surface;
Combining various sources of evidence to determine user intent;
Optional latency period to delay contact responses;
Differentiation of palm rejection algorithm based on type of computing device; and
Creating, accessing, and applying per-user personalization information to arbitrary touch-sensitive computing devices.

2.1 Operational Overview:

As noted above, the processes described herein provide various techniques for differentiating between intentional and unintentional contacts on various contact-sensitive surfaces of contact-sensitive computing devices. This discrimination between valid user finger-touch or input device contacts (e.g., pen, stylus, etc.) and invalid or inadvertent contacts allows the Contact Discriminator to provide a significantly improved user experience for touch-sensitive computing devices. These discrimination capabilities also allow the Contact Discriminator to disable or ignore regions or sub-regions of touch-sensitive surfaces while still accepting inputs from one or more sources on other areas of those touch-sensitive surfaces.

Examples of contacts considered by the Contact Discriminator include single, sequential, concurrent, or simultaneous user finger touches (including gesture type touches), pen or stylus touches or inputs, hover-type inputs (based on finger or pen hover), or any combination thereof. The Contact Discriminator then acts on contacts determined to be valid inputs while rejecting or ignoring invalid contacts or inputs. Again, in various embodiments, the Contact Discriminator also disables or ignores one or more regions or sub-regions of input surfaces in response to actual or expected contacts of portions of the user's hand while holding and using a pen or the like).

Further, in various embodiments, the Contact Discriminator also leverages hover-related information to determine whether to disable one or more regions or sub-regions of the input surface.

For example, some applications disable finger-touch across the entire input surface when a pen is in hover mode above that input surface, with only actual pen contacts then being accepted as valid input. Unfortunately, there are several disadvantages to this approach. In particular, disabling the entire input surface when a pen is in hover mode above that input surface precludes the ability to enable simultaneous pen and touch. Advantageously, in contrast to such techniques, the capability of the Contact Discriminator to consider concurrent or simultaneous inputs allows both hover and concurrent input or contact by additional pens or finger-touches.

2.2 Exemplary Information Considered by the Contact Discriminator:

In general, the Contact Discriminator considers and/or evaluates one or more of the following signals or parameters on either a periodic or continuous basis to determine whether any particular contact is valid or otherwise intended as input:

1) Image of Touch on Input Surface: In contrast to existing touch-type techniques that merely consider centroids of larger contacts with an input surface, in various embodiments, the Contact Discriminator considers an actual image (i.e., a "blob" like shape corresponding to contact of hand portions with the touch-sensitive input surface) or outline of a plurality of contact regions on the input surface. Such considerations are useful for rejecting or ignoring various contacts while concurrently allowing other contacts to be accepted as valid. Note that these concepts are discussed in further detail in Section 2.3.

2) Relative Angle and Approach of Pen to Input Surface: One or more of the aforementioned co-pending U.S. applications describe a variety of techniques for sensing the relative angle and approach of the pen to the input surface. Note that these concepts are also discussed in further detail in Section 2.4.

3) Pen and/or Finger Hover: In general, the Contact Discriminator considers various issues with respect to hover. For example, in various embodiments, the Contact Discriminator is capable of using a variety of sensors to determine when the pen (or finger) is within a certain range of the input surface of the touch-sensitive computing device. The Contact Discriminator is further capable of responding differently to different hover heights, as discussed in further detail in Section 2.5.

4) Pen Grip Sensing: One or more of the aforementioned co-pending U.S. patent applications describe various techniques for sensing grip on a pen or stylus, (e.g., tripod, sketch, tuck, wrap, etc.) and leveraging that information to understand the intent of the user, e.g., writing, sketching, etc. In various embodiments, grip sensing is combined with hover information to improve palm or hand portion sub-region rejection. Note that grip sensing is also discussed in further detail in Section 2.6.

5) Other Types of Grip Sensing: In addition to pen grip sensing, other types of grips are considered by the Contact Discriminator. For example, as noted above, any surface of the computing device (e.g., touch-screen, bezel, back, etc.) can be touch-sensitive. Therefore, by determining whether hand portion contacts with any such surface represents a grip (i.e., user holding device in gripping hand while providing input with the other hand), the Contact Discriminator can disable or ignore regions or sub-regions of any touch-sensitive surface of the overall computing device. For example, this type of sensing allows the Contact Discriminator to determine whether the user's thumb on a touch-screen of the computing device represents an attempted input, or is simply a contact resulting from the user's grip that is therefore to be ignored or rejected.

6) Concurrent Stylus and Touch using Separate Hands: In various embodiments, the Contact Discriminator uses various sensors and information discussed above, in combination with various other techniques to determine which touches are coming from the hand with the stylus versus the other hand. See Section 2.7 for further discussion of these concepts.

7) Latency before Responding to Touch or Contacts: In various embodiments, one of the issues considered by the Contact Discriminator is that before the image of the user's palm or other hand portions becomes visible (as large blob) to the sensor of the input surface, the initial touching of palm can appear to sensor logic as one or more fingers. Consequently, in various embodiments, the Contact Discriminator uses an adjustable or dynamically variable delay period $T_d$ to delay or reversibly begin response to potentially valid inputs. See Section 2.8 for additional discussion of the delay period $T_d$ in various contexts.

8) Responding to Different Types of Computing Devices: In various embodiments, the Contact Discriminator tailors the touch-discrimination processes and algorithms described herein to respond differently to the existing sensors in different types of computing devices. For example, different types of computing devices or touch-sensitive surfaces (e.g., e-reader, tablet, slate, dual-screen booklet, horizontal surface, vertical surface, wall-mounted display, etc.) are often associated with a wide variety of different sensor types and capabilities. Consequently, the various techniques described herein for discriminating between, or assigning gradated probabilities to, one or more single, sequential, or concurrent valid user contacts and invalid or inadvertent contacts, are adapted to both the particular type of computing device and the specific sensing properties and capabilities of the particular computing device.

9) Personalization Information: In various embodiments, the Contact Discriminator enables personalization of contact validation or rejection on a per-user basis by leveraging the various sensors and information discussed above. Personalization is discussed in further detail in Section 2.10.

2.3 Disabling or Ignoring Regions or Sub-Regions of Input Surface:

First, as noted above, it should be understood that one or more of the aforementioned co-pending U.S. Patent Applications describe various techniques for determining actual or expected palm or hand portion contact regions on the touch screen. These determinations are used in combination with one or more of the techniques described below to enable the Contact Discriminator to disable or ignore input from one or more regions or sub-regions of the input surface.

The general concept is that one or more regions or sub-regions of the overall touch surface corresponding to parts of the users hand are disabled when the Contact Discriminator determines that the user intends to write with a stylus held in that hand. Thus, for example, for a right-handed person, the palm will likely be just below and to the right of the pen tip, so the Contact Discriminator disables or ignores touch in and around the actual or expected region palm contact.

Note that the Contact Discriminator also considers the orientation and/or approach of the pen with respect to an X-Y axis of the input surface of the computing device to determine where the user's palm is to be expected. For example, given a pen tip in the same spot on the input surface, if the user rotates the computing device (e.g., changes from portrait to landscape orientation), the sub-region of the input surface disabled or ignored by the Contact Discriminator will be different. In other words, regardless of the planar rotation of the computing device relative to the user, the Contact Discriminator is capable of evaluating the orientation and approach of the pen to determine which sub-regions of the input surface to disable or ignore while still accepting inputs for the remainder of the input surface.

Figure 4:
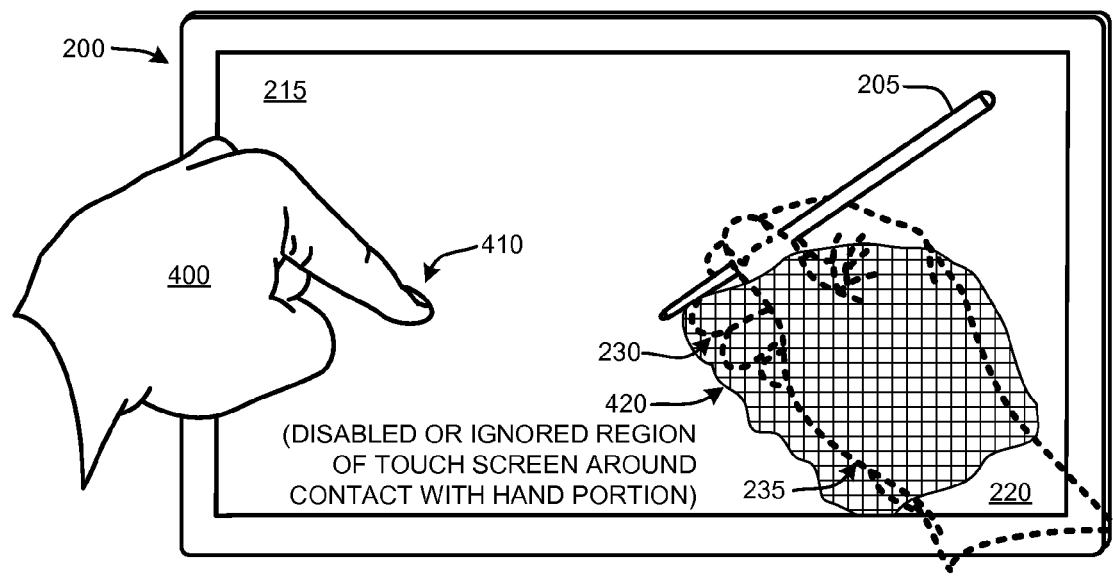
FIG. 4 illustrates an example of using the "Contact Discriminator" to disable sub-regions of a touch-sensitive surface, or reject input originating within such sub-regions, resulting from contacts of portions of a user's hand or palm while concurrently accepting or allowing separate pen-touch and finger-touch type inputs, as described herein.
Figure 5:
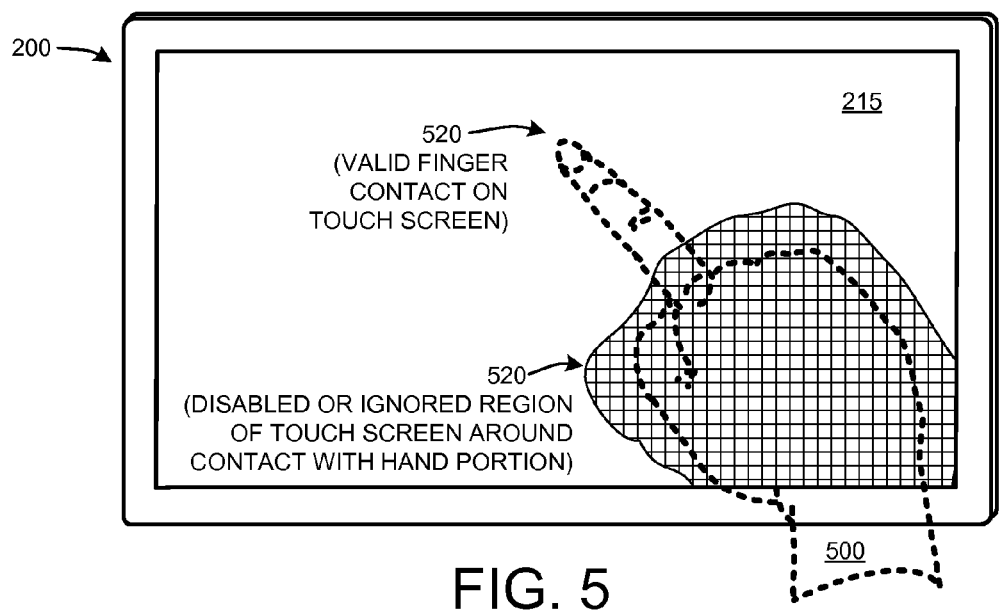
FIG. 5 illustrates an example of using the "Contact Discriminator" to disable sub-regions of a touch-sensitive surface, or reject input originating within such sub-regions, resulting from contacts of portions of a user's hand or palm while concurrently accepting or allowing concurrent finger-touch type inputs with that same hand, as described herein.

These capabilities offer several advantages. For example, as illustrated by FIG. 4, discussed below, this allows for the aforementioned sub-region rejection of hand portions resting on the input surface while the user writes with a pen. Similarly, as illustrated by FIG. 5, discussed below, these considerations allow the user to rest her hand on the input surface with one finger extended to provide valid finger-touch input with that same hand. These capabilities enable the Contact Discriminator to determine whether a wide variety of touch or contacts are valid relative to other concurrent invalid contacts.

For example, FIG. 4 illustrates a simple example where a single sub-region of the input surface is disabled or ignored while allowing concurrent pen and finger-touch contacts. In particular, given the same touch-sensitive computing device 200 illustrated in FIG. 2, FIG. 4 again illustrates portions of the user's right hand 220, including several fingers 230 and a portion of the user's palm 235 in contact with the touch screen 215 of the computing device. FIG. 4 further illustrates pen 205 in contact with the touch screen 215 such that input is being received from that pen.

In this example, the Contact Discriminator disables or ignores sub-region 420 of the touch screen 215 that surrounds the actual (or expected) contact portions of the user's right hand 220. In other words, inputs are allowed in all regions of the touch screen 215 other than sub-region 420.

Advantageously, since the Contact Discriminator allows sequential, concurrent, and/or simultaneous contacts, the example of FIG. 4 also shows the finger 410 of the user's left hand 400 providing a finger-touch input to the touch screen 215. In particular, given the context of this particular finger-touch, the Contact Discriminator determines that finger 410 is intended by the user to provide input to the touch screen 215 in combination with input from pen 205.

Similarly, FIG. 5 illustrates a simple example where a single sub-region of the input surface is disabled or ignored for a portion of the user's hand while allowing concurrent finger-touch contacts from a finger of that same hand. In particular, given the same touch-sensitive computing device 200 illustrated in FIG. 2, FIG. 5 illustrates portions of the user's right hand 500 resting on the touch screen 215 of the computing device. FIG. 5 further illustrates finger 520 of that same hand in contact with the touch screen 215 such that input is being received from that finger.

In this example, the Contact Discriminator disables or ignores sub-region 520 of the touch screen 215 that surrounds the actual (or expected) contact portions of the user's right hand 500. In other words, inputs are allowed in all regions of the touch screen 215 other than sub-region 520.

Advantageously, such embodiments allows the user to rest the majority of their hand on an input surface while still enabling finger-touch input from a finger extended from that hand. Such embodiments also serve to reduce user fatigue since the user is not required to hold her hand over the touch screen during extended periods of use.

In general, one of the first questions considered when determining actual or expected hand portion contact regions on the touch screen is whether the user is left-handed or right-handed. This determination can be achieved using various techniques. First, the Contact Discriminator can perform simple observations on relative locations between pen contact and actual hand portion contact when the user is writing to determine whether the user is left or right handed. For example, if the user is writing left-handed, the contact region will generally be below and to the left of the pen tip (assuming a left-to-right language such as English). Another simple process for answering the handedness question is simply to ask the user via an automated prompt, a menu, a pop-up dialog box, etc. The user can also be asked to perform simple training tasks (e.g., "please write the following sentence . . . ") to determine user handedness. Note that, in various embodiments, this handedness information is stored on a per-user basis along with other optional personalization parameters to allow for per-user customization, as discussed below in Section 2.10.

As noted above, in various embodiments the Contact Discriminator disables or ignores input from one or more regions or sub-regions of the input surface. However, the intent here is not an absolute rejection of disabled or ignored input. In particular, by associating a probabilistic score or metric with various contacts, certain input may be simultaneously partially valid and partially invalid, either in a probabilistic sense or depending on the end-user application semantics of the touch. Hence, "rejected' or "ignored" inputs may nonetheless be propagated to end-user applications, but tagged appropriately as "palm-type inputs" with a given probability.

In other words, in various embodiments, "ignoring" or "rejecting" particular contacts or input is instead intended to mean deprecating, or altering the interpretation, of inputs deemed likely to be palm contact. Consequently, such input is not completely ignored by the system, or is made available to applications to use in a suitable manner. Such inputs furthermore may be tagged with a qualifying type of contact, and/or a probability of intentional contact so that the operating system input event stack, or particular applications, can handle the inputs appropriately.

2.3.1 Evaluating User Writing Practices for Palm-Rejection Purposes:

In various embodiments, the Contact Discriminator evaluates the typical writing practices of each user to allow for personalization of hand portion rejection regions. In particular, in various embodiments, the Contact Discriminator evaluates one or more of the following parameters to customize sub-regions for rejection on a per-user basis:

1) The typical hand portion touch points that occur before the pen-nib touches the input surface;
2) The size and profile of the user's palm area (including the profile of any portion of any of the user's fingers that typically contact the input surface before and during writing actions);
3) The speed of user hand and pen movements, i.e., the duration between the initial touch points in the area of the hand portion in contact with the input surface and when the image of that contact area is recognizable as a portion of the hand and/or when the nib of the pen touches the input surface.
4) The fine-grained motion dynamics of the pen, as sensed by motion sensors, as well as the matching pattern of fine-grained motions imparted to the writing surface by both the hand grasping the pen and the hand holding the writing surface (if any).
5) The user's grip on the pen, as well as of the writing surface, as sensed by grip sensors.

As in other cases noted above, the data described above can be gathered based on training tasks (e.g., note taking, sketching, annotating, etc.) that the user is asked to perform during an initialization process. Alternatively, the Contact Discriminator can simply observe user behavior over time when interacting with various applications. In fact, the Contact Discriminator can customize the hand portion rejection areas on a per-application basis, depending upon whether the user interacts with different applications using different pen-handling characteristics (e.g., user pen use within sketching applications may be different than that in note-taking applications). Advantageously, in a multiple window scenario where two or more applications may be active or displayed on different regions of a touch screen, the Contact Discriminator can concurrently apply the different user behaviors to each separate region of the screen where a particular application is being displayed.

Such information is used to personalize parameters for palm or hand portion rejection (see also Section 2.10 for further discussion regarding per-user personalization). For example, in various embodiments, these personalization parameters include:

1) A delay or latency $T_d$ during which to ignore or delay response to touches in the palm region;
2) The shape and area of the sub-region where palm or hand portion is expected and where touches are delayed or ignored; and
3) The desired hover height at which palm-rejection should kick in (if, in fact, hover height is measurable and indicated to the Contact Discriminator).

2.4 Relative Orientation of Input Surface and Pen:

If a touch-sensitive computing device such as a tablet computer, for example, is being held or positioned at other than flat or 90 degrees, then merely checking the angle or orientation of the pen or stylus is not necessarily sufficient to determine user intent with respect to using the stylus to provide input. The Contact Discriminator therefore addresses this issue by instead determining relative orientation between stylus and input surface. This also enables the Contact Discriminator to adapt to situations where the user writes on a tablet in the landscape versus portrait orientation, for example.

Typically, when a user is writing on an input surface, the pen or stylus angle tends to approach a perpendicular orientation with respect to the input surface of the computing device. Conversely, the pen angle is typically shallower (i.e., pen closer to parallel with respect to the input surface) for other non-writing gestures, e.g., when the user uses fingers on the hand holding the pen to "turn" pages in an eBook using finger-touch type gestures. These observations are leveraged by the Contact Discriminator when determining whether particular contacts are valid.

Further, relative pen/input surface orientation and approach information can also be used by the Contact Discriminator with respect to the X-Y coordinate system of the input surface to determine relative orientation to the user (e.g., portrait vs. landscape orientation). In addition, as noted above, this same information can be used by the Contact Discriminator to determine where the user's palm or other hand portions are likely to contact the input surface when writing with the pen (see Section 2.3.1).

In general, existing pens can be adapted for use by the Contact Discriminator to provide some or all of the functionality noted above. For example, in using existing pens that do not communicate orientation, the Contact Discriminator can rely simply on orientation of the input surface of the touch-sensitive computing device using the gravity vector to determine approximately where to expect the user's palm with respect to the pen nib. Orientation of the input surface relative to the user can be determined by adapting conventional algorithms that determine orientation of a hand-held phone or media player (e.g., images on screen shifts from portrait to landscape as the user rotates the device).

Unfortunately, the gravity-based technique noted above will not work when the input surface is lying flat on a table (e.g., a tablet type computer resting on a flat surface). The Contact Discriminator addresses such issues using various techniques, as discussed below.

For example, when the user begins writing on the input surface, the input surface will also return a signal relaying where the user's palm is with respect to the pen-nib. In various embodiments, the Contact Discriminator uses this information to initialize a starting orientation that will benefit many subsequent interactions. Further, given a starting orientation, if the user rotates the computing device in the plane of the table, then a combination of gyroscope and/or magnetometer sensors in the computing device will allow the Contact Discriminator to initially predict or determine where to expect the user's palm, assuming that the user does not also change position when rotating the computing device. The Contact Discriminator will then update or correct the initial palm-region prediction as additional observations of actual palm placement become available to the system during use. Advantageously, these algorithms have the capability to continuously adjust the expected location of palm based both on observed user behavior and on predictions based on gravity and/or gyroscopic sensors in the computing device.

As an alternative to the technique discussed above, in various embodiments, the computing device is modified for use with the Contact Discriminator by implementing the touchscreen or input surface of tablet type computers and the like using SIP panels. Similar results can be achieved by the Contact Discriminator by using a self-capacitance image of the large mass of the user's palm on the pro-capacitance sensor. In both cases, this information is again used to initialize expected palm contact region predictions.

In another embodiment, the Contact Discriminator leverages any built in front-looking camera to further help with orientation. For example, the camera can be activated to identify where the user is (and potentially the user's hands) relative to the input surface of the device by processing image captured by the camera using hand or facial detection or recognition techniques. Note that facial recognition can also be used to identify particular users for using per-user personalization information to tailor the operation of the Contact Discriminator to the preferences or behaviors of individual users, as discussed in further detail in Section 2.10.

In related embodiments, instead of indirectly inferring orientation of the pen with respect to the input surface of the computing device, the Contact Discriminator makes uses of embedded gravity and gyroscopic sensors in both the computing device and the pen for use in tracking relative orientations. Further, by observing user behavior, the Contact Discriminator tracks the relative angle at which user brings the pen to the input surface of the computing device as an initial indication of where the user's palm will be in relation to the pen.

In further embodiments, the Contact Discriminator makes use existing pen technology, such as Wacom® EMR® pens that use Electro-Magnetic Resonance technology to sense the orientation of pen. Polhemus-type magnetic sensing in pens can also be used to provide the Contact Discriminator with 3D orientation information. In either case, the pen orientation information is communicated to the computing device hosting the Contact Discriminator functionality to allow the Contact Discriminator to determine the validity of contacts. Various techniques for transmitting this data to the computing device include, but are not limited to using an external wireless communication system between the pen and the computing device, or implicitly through modulation of signal that the pen presents to the computing device even when the pen is not in contact with the input surface of the computing device.

In another interesting embodiment, the Contact Discriminator determines the relative orientation of the input surface and the pen by evaluating field lines projected from the pen onto the input surface. For example, the pen is adapted to project field lines (optical, electro-magnetic, etc.) onto the input surface. The shape of the field lines on the input surface is then evaluated by the Contact Discriminator to calculate the relative angle or orientation between the pen and the input surface.

In particular, assuming a field projection emanates along the longitudinal axis of the pen (e.g., projected from the pen tip), a circular projection on the input surface will then correspond to a perpendicular orientation of the pen to the plane of the input surface. Increasingly elliptical projections on the input surface represent an increasing angle away from perpendicular.

Advantageously, these same concepts can be used to determine hover height of the pen above the input surface by evaluating the size of the projection on the input surface. In particular, the size of the projection will naturally increase as the distance between the pen and the input surface is increased.

Figure 6:
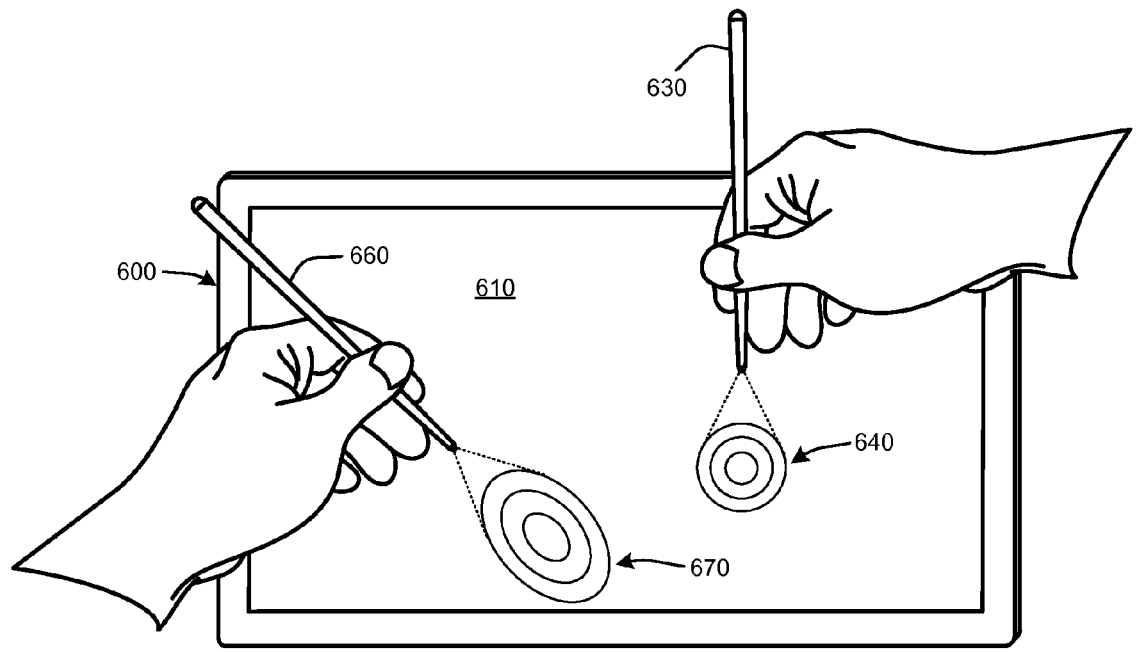
FIG. 6 illustrates an example of using the "Contact Discriminator" to determine relative angles or orientation between one or more pen or stylus type input devices and touch sensitive surfaces as those pen or stylus type devices hover over or approach the touch sensitive surfaces, as described herein.

Further, in various embodiments, the pen both projects and reads the shape and or size of field lines and reports this information to the Contact Discriminator for processing. Alternately, the size and shape of the field lines are detected by the input surface itself, or by sensors positioned to read the projection of the field lines on the input surface, with this information again being reported to the Contact Discriminator for processing FIG. 6 illustrates an example of using the "Contact Discriminator" to determine relative angles or orientation between one or more pen or stylus type input devices and touch sensitive surfaces as those pen or stylus type devices hover over or approach the touch sensitive surfaces, as described herein. For example, as illustrated by FIG. 6, circular projected field lines 640 would correspond to a pen 630 held perpendicular to the input surface 610 of computing device 600, while those field lines would become increasingly elliptical (i.e., field lines 670) as the angle of a pen 660 is increasingly deviated from a perpendicular orientation. Note also that the size of projected field lines is directly proportional to the distance of the pen input device to the input surface, with the size of the projection decreasing as the pen approaches the input surface. Therefore, in various embodiments, the Contact Discriminator determines hover distance based on projected field size.

2.5 Hover Height and Accuracy:

As noted above, the projection of field lines can be used by the Contact Discriminator to determine hover height. However, other existing techniques can also be used to determine hover height, including various techniques described in one or more of the aforementioned co-pending U.S. Patent Applications.

Various embodiments of the Contact Discriminator consider binary hover sensing (i.e., whether or not a pen or stylus is in proximity to a corresponding input surface). That proximity signal, in itself, is useful for a number of applications even if actual hover height sensing is not available for a particular device. Furthermore note that hover often has an x-y position associated with it (relative to the plane of a corresponding input surface), so the Contact Discriminator generally knows approximately where the pen is hovering, although this accuracy of this x-y location may become noisier with greater height.

Further, in various embodiments, the Contact Discriminator considers a plurality of different hover heights to provide different functionality to the user based on the hover height of the pen (or fingertip) above the input surface. For example, in a one embodiment, the Contact Discriminator considers two distinct hover hover-values (i.e., "low-hover" and "high-hover") to provide the user with varying behaviors by the computing device.

Low-Hover: This is the height ($H_{lh}$) where the x-y location of the pen-nib above the surface is relatively accurately known. In a tested embodiment, a $H_{lh}$ value of approximately 5 mm was used, though any desired value can be used. Below this height, an operating system such as Windows® 8 will display the cursor on the screen and/or display a mouse-hover UI, depending upon the context.

High-Hover: Windows® 8 currently provides functionality referred to as pen-in-range that it uses to disable finger-touch across the entire input surface whenever the pen is within a certain distance of that input surface. For pen-in-range there is no requirement for X-Y location to any degree of accuracy. In contrast to such functionality, the Contact Discriminator uses the concept of "high-hover" height ($H_{hh}$) in combination with an approximate X-Y pen location that is known within some confidence level. For example, in one embodiment, the Contact Discriminator used a "high-hover" height ($H_{hh}$) of 25 mm, with an X-Y pen location accuracy of about 10 mm radius with 90% confidence. Knowing this X-Y location is useful, since the Contact Discriminator can then disable or ignore finger-touch or other contacts on selected sub-regions of the input surface rather than then entire surface as with existing techniques.

In one embodiment of the Contact Discriminator, no cursor is shown on the input surface when the pen is at or between the $H_{hh}$ and $H_{lh}$ levels. However, when hovering in this same range, the Contact Discriminator does either ignore or reject finger-touch contacts, or delays response to such contacts in the sub-region where the palm is likely to occur, as discussed above.

It should be clear that the Contact Discriminator is not limited to the above-described embodiment that ignores or rejects finger-touches in the palm sub-region when stylus is at or between the $H_{hh}$ and $H_{lh}$ levels. For example, the Contact Discriminator can simply delay acting on the touches sensed in the palm sub-region by delay period $T_d$ (as discussed above), where the delay period $T_d$ ensures that as the user brings her hand down to write, any initial touches that may have been falsely interpreted as fingers are instead recognized as a "palm" with high confidence and hence are ignored or rejected by the Contact Discriminator. Given the wide variety of available pens and input surfaces that are available, whether the Contact Discriminator ignores the contact, or whether the Contact Discriminator delays response to that contact is a function of the hover height that the sensor-system of the computing device and pen combination can support. Further, this choice can also be based on the user's usage of pen (e.g., how they hold their pen, how quickly they bring the pen down to write, what kind of false touches they generate, etc.).

2.6 Leveraging Grip Sensing and Relative Orientation of Stylus:

As noted above, a variety of techniques for evaluating and responding to pen or stylus grip are described in one or more of the aforementioned co-pending U.S. Patent Applications. In the context of the Contact Discriminator, pen grip sensing can be used for a number of purposes to enhance the user experience. For example, as noted above, user grip can be used by the Contact Discriminator to help determine the validity of contacts, e.g., a pen held in a writing grip and typical writing orientation relative to the input surface is more likely to be used to write than a pen held in a different type of grip or orientation. Further, in terms of personalization, particular users may not only use hand/fingers for gripping, but may also use fingers on their grip hand to provide finger-touch inputs, depending upon grip and orientation of the pen relative to the input surface.

Pens can be constructed using grip sensors (e.g., capacitive, pressure, etc.) on any or all sides of the pen. Such sensors can be used for a variety of purposes. For example, a grip combined with a user finger motion along the length of the pen can be used to initiate a scroll-type operation. Other personalization operations can be based on how a particular user holds the pen. In this context, the Contact Discriminator can prompt the user to complete a pre-defined training phase that is designed to provide the Contact Discriminator with per-user grip behaviors across a range of input scenarios. Similarly, the Contact Discriminator can simply learn this information based on an evaluation of user behaviors over time.

For example, knowing that the user is holding the pen or stylus with the grip they normally use for inking and/or that the pen has a relative orientation for likely inking increases the confidence that the user is ready for inking action. As noted above, grip usage parameters can further be personalized for each user through observation during a training phase or general usage. These parameters can then be used by the Contact Discriminator to further increase or decrease the likelihood that the Contact Discriminator will ignore or delay touches or contacts to certain areas of sub-regions of the input surface.

2.7 Combining Various Sources of Evidence:

In various embodiments, the Contact Discriminator combines various sources of evidence (both for spatial region boundary, and for action taken in response to observed touches or contacts). For example, palm-rejection sub-regions are generally approximate, and may have delays associated with input in those regions due to at least some level of uncertainty as to whether contacts in such regions are valid or not. In other words, it is difficult to infer the user's actual intention with absolute accuracy in every possible instance of contact.

Therefore, in various embodiments, the Contact Discriminator uses heuristics to combine the various sources of evidence described above to estimate user intention (e.g., the contact validation module described with respect to FIG. 3). In various embodiments, the Contact Discriminator uses simple deterministic methods for such purposes. For example, the Contact Discriminator can use deterministic rules such as, for right-handed people, all touches in a rectangular area below and to the right of the pen X-Y hover location are to be ignored.

Alternatively, the Contact Discriminator uses a probabilistic framework where each of the various sources of evidence described above provides a probabilistic likelihood that it is a false-touch (possibly for each pixel of the input surface). The Contact Discriminator then composes the likelihoods from the various sources of evidence while still staying in an analog probability space, and only discretizes or thresholds at the end (after combining all input sources) to decide whether to classify any particular contact as valid or invalid. In some embodiments discretization can be bypassed with the full probabilistic information being passed along to the system and applications. Clearly, other probabilistic or machine learning techniques for combining the various sources of evidence described above can be used to determine whether a particular contact is valid.

2.7.1 Determining which Hand is Holding Pen:

One useful piece of information that can be obtained by evaluating some of the various sources of evidence described above is to determine whether the user is writing with her left hand or her right hand, or whether one hand is holding a pen and the other is not.

For example, in various embodiments, the pen is adapted to send an electrical signal (not physically detectable or in any way harmful to the user) from the pen through the user's hand that can be detected by the touch system of the computing device.

More specifically, the other hand is naturally electrically connected through the body to the hand holding the pen. This connection can be thought of as a transmission line with substantial resistance and capacitance. Thus, by choosing a suitable frequency, the signal path from the non-stylus hand to the stylus will be very lossy compared to the path from the hand with the pen. The touch surface of the computing device is then used to detect that signal either from both hands, or only from the hand not holding the pen (assuming that is the only hand in contact with the input surface. The Contact Discriminator can then easily differentiate between a lossy signal version emanating from the hand not holding the pen, and a clearer signal version emanating from the hand holding the pen.

One technique for implementing this type of capability is to detect a row drive signal on the input surface and emit a synchronized signal (traveling from the pen hand through the user's body to the other hand in contact with the input surface) for detection on the columns of a mutual capacitance touch sensor of the input surface.

2.8 Latency Period to Delay or Undo Contact Response:

As noted above, in various embodiments, the Contact Discriminator decides whether to use some adjustable delay period $T_d$ to delay responding to particular touches. This delay period gives the Contact Discriminator additional time to determine whether the initial touches will turn into a palm that is to be rejected.

In general, given that any particular contact could subsequently be determined to be invalid following an initial determination of validity, the Contact Discriminator can act in any of several ways. For example, the Contact Discriminator can simply respond to a presumably valid contact with little or no latency and let user manually undo the resulting action if that action was unwarranted. Alternately, the Contact Discriminator can simply respond with little or no latency and then automatically or programmatically undo the resulting action if the Contact Discriminator subsequently determines that the action was unwarranted.

Advantageously, in various embodiments, the Contact Discriminator uses various combinations of the sensors and information discussed above to dynamically vary the delay period $T_d$ before responding to observed touches on the sensor. In other embodiments, the period $T_d$ is fixed at some user adjustable period (or some period automatically estimated by the Contact Discriminator based on prior user interactions with the input surface of the computing device.

Note that depending upon the length of the latency period, the resulting delay in system response may appear to the user to be caused by a slow or unresponsive computer. Therefore, rather than delay a response to a particular contact, in various embodiments, the Contact Discriminator acts on those contacts, then reverses or undoes whatever action was initiated if it is later determined that the corresponding contact was not a valid input attempt. Consequently, the undo capabilities of the Contact Discriminator provide a practical way of solving for a problem where one or more sensing mechanisms have a tough time initially classifying a contact event as a valid input attempt, then later determines that the contact is not a valid input attempt. In general, this undo capability is enabled by saving a current system state before initiating whatever action corresponds to the presumably valid input attempt. Then, within a small window of time (e.g., the aforementioned latency period), if the presumably valid touch or contact is subsequently reclassified as an invalid input attempt, any actions initiated are simply undone by restoring the previously saved state.

2.9 Customizing Response Based on Type of Computing Device:

In various embodiments, the palm rejection algorithms and techniques described herein for implementing the Contact Discriminator are differentiated based on the type of computing device in combination with the sensor capabilities and intended use of such devices.

More specifically, different types of computing devices or touch-sensitive surfaces (e.g., e-reader, tablet, slate, dual-screen booklet, horizontal surface, vertical surface, wall-mounted display, etc.) are often associated with a wide variety of different sensor types and capabilities. Consequently, the various techniques described herein for discriminating between, or assigning gradated probabilities to, one or more single, sequential, or concurrent valid user contacts and invalid or inadvertent contacts, are adapted to both the particular type of computing device and the specific sensing properties and capabilities of whatever touch, stylus, and other input modalities are associated with the particular computing device.

For example, in the case of an e-reader or the like, the user often holds these types of devices in one hand while reading and potentially interacting with the screen contents. Consequently, it is likely that relatively stationary contacts on the bezel or screen of such devices may be associated with a user grip not intended as input. In contrast, in the case of a wall-mounted touch-sensitive display device, user contacts with the display, even if relatively stationary, are more likely to be intended as contacts than in the e-reader example.

The general idea here is that in various embodiments, the behavior of the Contact Discriminator in response to potential user inputs is automatically adapted to the sensing capabilities and expected usage profiles of whatever computing device is hosting the Contact Discriminator for enhancing the user's input experience.

2.10 Storing and Accessing Personalization Information:

As noted above, personalization information can be developed on a per-user basis to tailor the operation of the Contact Discriminator to the preferences or behaviors of individual users. Further, this allows particular computing devices to switch behavior profiles whenever a different user provides input, so long as the new user is known to the Contact Discriminator. Examples of ways in which the user can be identified to the computing device hosting the Contact Discriminator include, but are not limited to, providing a per-user login or identification mechanism, providing an RFID tag or unique computer-readable serial number or other identifier associated with the user's pen or other input device, etc.

In various embodiments, a generic or average user profile is provided to the Contact Discriminator as an initial baseline. This initial profile can be constructed by determining average user behavioral parameters over some group of users. These initial parameters can then be "hardcoded" or used as a default by the Contact Discriminator for palm-rejection purposes. In further embodiments, touch-sensitive computing devices used by the Contact Discriminator make use of default parameters that are then automatically tuned by the Contact Discriminator.

In particular, the Contact Discriminator performs this tuning based either on:

1) One-time training tasks and observing the specific grip that the user uses for writing, their palm profile, whether they are left-handed or right-handed, etc.; or
2) Tuning is performed based on observing these parameters during usage of the computing device by the user and continuously updating those parameters for palm-rejection.

Overall, personalization provides an advantageous adaptation of touch-sensitive computing devices since there is generally a significant variation in how different users write and interact with touch-sensitive computing devices such as slates or tablets. As such, the Contact Discriminator ensures that such devices are personalized to the behaviors and idiosyncrasies of each individual user rather than pushing a one-size fits all approach for such devices.

For example, "User A" may typically rest all or part of her left hand (not intended to provide input) on an input surface of a touch-sensitive computing device while providing input via a finger touch or pen input using her right hand. As noted above, in various embodiments, the Contact Discriminator is capable of differentiating between the user's left and right hands. Consequently, by associating this profile with User A, the Contact Discriminator can simply ignore (in the above-described scenario) any "input" received from the user's left hand. Similarly, "User B" may tend to frequently hover a pen (not intended as input) held in his right hand while providing a finger-touch input using that same hand. Consequently, by associating this profile with User B, the Contact Discriminator can simply ignore (in the above-described scenario) any "input" received from the from a hover-type input of the pen when the user is providing a finger-touch input with the hand holding the pen.

Such profiles can be stored in the cloud, stored on particular touch-sensitive computing devices, stored on some type of computer-readable memory, etc., and then simply downloaded to one or more touch-sensitive computing devices by the user. In other words, all of the personalization information described above could be stored locally on the machine, or it could be stored in the cloud and just cached on the local machine whenever that machine is to be personalized for a particular user. If stored in cloud and cached dynamically, then if a user is using a touch-sensitive computing device belonging to another person, even for only a few minutes, the new user's profile can be temporarily uploaded and used for immediate customization of that device for the user. That device can then simply revert to the owner's profile as soon as the new user relinquishes control of the device.

Figure 7:
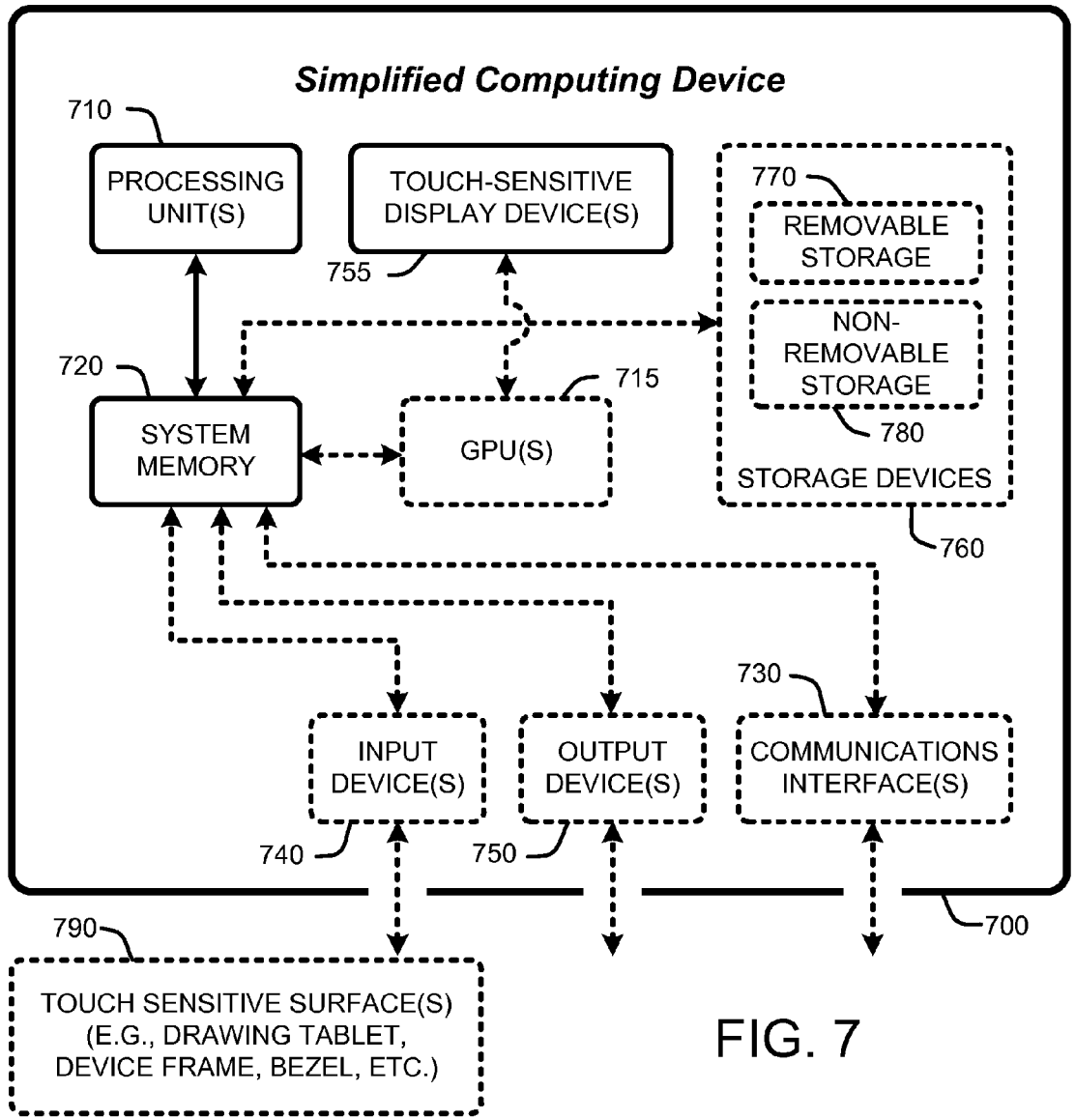
FIG. 7 is a general system diagram depicting a simplified general-purpose computing device having simplified computing and I/O capabilities for use in implementing various embodiments of the Contact Discriminator, as described herein.

3.0 Exemplary Operating Environments:

The Contact Discriminator described herein is operational within numerous types of general purpose or special purpose computing system environments or configurations. FIG. 7 illustrates a simplified example of a general-purpose computer system on which various embodiments and elements of the Contact Discriminator, as described herein, may be implemented. It should be noted that any boxes that are represented by broken or dashed lines in FIG. 7 represent alternate embodiments of the simplified computing device, and that any or all of these alternate embodiments, as described below, may be used in combination with other alternate embodiments that are described throughout this document.

For example, FIG. 7 shows a general system diagram showing a simplified computing device such as computer 700. Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, audio or video media players, etc.

To allow a device to implement the Contact Discriminator, the device should have a sufficient computational capability and system memory to enable basic computational operations. In particular, as illustrated by FIG. 7, the computational capability is generally illustrated by one or more processing unit(s) 710, and may also include one or more GPUs 715, either or both in communication with system memory 720. Note that that the processing unit(s) 710 of the general computing device of may be specialized microprocessors, such as a DSP, a VLIW, or other micro-controller, or can be conventional CPUs having one or more processing cores, including specialized GPU-based cores in a multi-core CPU.

In addition, the simplified computing device of FIG. 7 may also include other components, such as, for example, a communications interface 730. The simplified computing device of FIG. 7 may also include one or more conventional computer input devices 740 (e.g., pointing devices, keyboards, audio input devices, video input devices, haptic input devices, devices for receiving wired or wireless data transmissions, etc.). The simplified computing device of FIG. 7 may also include other optional components, such as, for example, one or more conventional computer output devices 750 (e.g., touch-sensitive display device(s) 755, one or more other touch sensitive surfaces 790, audio output devices, video output devices, devices for transmitting wired or wireless data transmissions, etc.). Note that typical communications interfaces 730, input devices 740, output devices 750, and storage devices 760 for general-purpose computers are well known to those skilled in the art, and will not be described in detail herein.

The simplified computing device of FIG. 7 may also include a variety of computer readable media. Computer readable media can be any available media that can be accessed by computer 700 via storage devices 760 and includes both volatile and nonvolatile media that is either removable 770 and/or non-removable 780, for storage of information such as computer-readable or computer-executable instructions, data structures, program modules, or other data. By way of example, and not limitation, computer readable media may comprise computer storage media and communication media. Computer storage media includes, but is not limited to, computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Storage of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer to a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Further, software, programs, and/or computer program products embodying the some or all of the various embodiments of the Contact Discriminator described herein, or portions thereof, may be stored, received, transmitted, or read from any desired combination of computer or machine-readable media or storage devices and communication media in the form of computer executable instructions or other data structures.

Finally, the Contact Discriminator described herein may be further described in the general context of computer-executable instructions, such as program modules, being executed by a computing device. Generally, program modules include routines, programs, objects, components, data structures, etc., that perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

The foregoing description of the Contact Discriminator has been presented for the purposes of illustration and description. It is not intended to be exhaustive or to limit the claimed subject matter to the precise form disclosed. Many modifications and variations are possible in light of the above teaching. Further, it should be noted that any or all of the aforementioned alternate embodiments may be used in any combination desired to form additional hybrid embodiments of the Contact Discriminator. It is intended that the scope of the invention be limited not by this detailed description, but rather by the claims appended hereto.

What is claimed is:

1. A touch-sensitive computing device, comprising:
   one or more touch-sensitive input surfaces;
   a touch input mechanism that identifies a plurality of contact areas between one or more portions of at least one of a user's hands and at least one of the touch-sensitive input surfaces;
   in response to the identification of the plurality of contact areas, the touch input mechanism further identifying one or more predicted areas of contact on the touch-sensitive input surfaces, prior to actual user contact with those predicted areas, that are expected to receive unintentional contacts concurrently with the contact between one or more portions of at least one of the user's hands and at least one of the touch-sensitive input surfaces;
   a touch evaluation mechanism that determines whether each of the plurality of contact areas corresponds to a valid user input attempt;
   a sub-region disabling mechanism that disables contact processing for any of the plurality of contact areas that does not correspond to a valid input attempt and that also disables contact processing for the predicted areas of contact; and
   a contact action mechanism for causing the computing device to initiate one or more actions corresponding to any contacts with areas of the touch-sensitive input surfaces for which contact processing has not been disabled.

2. The touch-sensitive computing device of claim 1 further comprising a multi-touch mechanism for responding to two or more concurrent contacts that have been determined to be valid input attempts.

3. The touch-sensitive computing device of claim 1 wherein one or more of the contacts are provided by any combination of one or more finger, pen and hover-based inputs to one or more of the input surfaces.

4. The touch-sensitive computing device of claim 1 further comprising a pen input mechanism for receiving inputs to one or more of the input surfaces from a pen input device.

5. The touch-sensitive computing device of claim 4 further comprising a hand discrimination mechanism for automatically determining whether any user finger-touch contact is from the user's hand holding the pen or from the user's other hand.

6. The touch-sensitive computing device of claim 5 wherein an electrical signal is sent from the user's hand holding the pen through the user's body to the user's other hand, and wherein a reading of that electrical signal as received through the user's other hand represents a lossy version of the original electrical signal that is sufficient to allow the computing device to determine which of the user's hands is holding the pen.

7. The touch-sensitive computing device of claim 4 further comprising an orientation sensing mechanism that projects field lines from the pen onto one of the touch-sensitive input surfaces, while the pen is at some hover distance away from that touch sensitive input surface, and evaluates a shape of the projected field lines on that touch-sensitive input surface to determine a relative orientation between the pen and that touch-sensitive input surface.

8. The touch-sensitive computing device of claim 4 further comprising a hover height sensing mechanism that projects field lines from the pen onto one of the touch-sensitive input surfaces and evaluates a size of the projected field lines on that touch-sensitive input surface to determine a distance between the pen and that touch-sensitive input surface.

9. The touch-sensitive computing device of claim 1 further comprising a sub-region prediction mechanism that predicts one or more of the areas expected to receive unintentional contacts based on a relative orientation between a hand-held pen and one of the touch-sensitive input surfaces.

10. The touch-sensitive computing device of claim 1 further comprising a personalization mechanism that uses a per-user usage profile for predicting one or more of the areas expected to receive unintentional contacts based on a relative orientation between a hand-held pen and one of the touch-sensitive input surfaces.

11. The touch-sensitive computing device of claim 1 further comprising an undo mechanism for undoing one or more actions initiated by the contact action mechanism in the event that the contact validation mechanism subsequently reclassifies any contact as an invalid input attempt.

12. A computing device having computer executable instructions stored therein for controlling contact responses of a touch-sensitive computing device, said instructions causing the computing device to execute a method comprising:
   identifying a plurality of contact areas between one or more portions of at least one of a user's hands and at least one of a plurality of touch-sensitive input surfaces;
   determining whether each contact area corresponds to a valid user input attempt;

in response to each valid user input attempt, identifying one or more predicted areas of contact on one or more of the touch-sensitive input surfaces, prior to actual user contact with those predicted areas, that are expected to receive unintentional contacts sequentially following the plurality of contact areas between one or more portions of at least one of the user's hands and at least one of the plurality of touch-sensitive input surfaces;

disabling contact processing for each contact area that does not correspond to a valid input attempt;

disabling contact processing for each predicted area of contact; and causing the computing device to initiate one or more actions corresponding to any contacts with areas of the touch-sensitive input surfaces for which contact processing has not been disabled.

13. The computing device of claim 12 further comprising instructions for responding to two or more concurrent contacts that have been determined to be valid input attempts.

14. The computing device of claim 12 wherein one or more of the contacts are provided by any combination of one or more finger, pen and hover-based inputs to one or more of the input surfaces.

15. The computing device of claim 12 further comprising instructions for determining a relative orientation between a hand-held pen and one of the touch-sensitive input surfaces by evaluating a shape of field lines projected by the pen onto that touch-sensitive input surface from some hover distance away from that touch-sensitive input surface.

16. The computing device of claim 12 further comprising instructions for using a per-user usage profile for predicting one or more of the areas expected to receive unintentional contacts based on a relative orientation between a hand-held pen and one of the touch-sensitive input surfaces.

17. A method for rejecting regions of unintentional contact on a touch-sensitive surface of a computing device, comprising:

identifying one or more contact areas between one or more portions of at least one of a user's hands and at least one touch-sensitive input surface;

in response to the identification of one or more contact areas, using a per-user usage profile to predict one or more areas of contact on the at least one touch-sensitive input surface, prior to actual user contact with those predicted areas, that are expected to receive unintentional contacts in combination with the contact between one or more portions of at least one of the user's hands and at least one touch-sensitive input surface;

determining whether each contact area corresponds to a valid input attempt by the user;

disabling contact processing for each contact area of any touch-sensitive input surface that does not correspond to a valid input attempt;

disabling contact processing for each predicted area that is expected to receive unintended contacts; and causing the computing device to initiate one or more actions corresponding to any contacts with areas of the at least one touch-sensitive input surface for which contact processing has not been disabled.

18. The method of claim 17 further comprising responding to two or more simultaneous contacts that have been determined to be valid input attempts.

19. The method of claim 17 wherein one or more of the contacts are provided by any combination of one or more finger, pen and hover-based inputs to one or more of the input surfaces.

20. The method of claim 17 further comprising determining a hover height between a hand-held pen and one of the touch-sensitive input surfaces by evaluating a size of field lines projected by the pen onto that touch-sensitive input surface.

\* \* \* \* \*